(12) United States Patent  
Ko et al.

(10) Patent No.: US 12,301,498 B2
(45) Date of Patent: May 13, 2025

(54) METHOD AND APPARATUS FOR PERFORMING SIDELINK-BASED POSITIONING

(71) Applicant: LG Electronics Inc., Seoul (KR)

(72) Inventors: Woosuk Ko, Seoul (KR); Hanbyul Seo, Seoul (KR); Seoyoung Back, Seoul (KR); Jaeho Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 17/791,365

(22) PCT Filed: Jan. 7, 2021

(86) PCT No.: PCT/KR2021/000186
§ 371 (c)(1),
(2) Date: Jul. 7, 2022

(87) PCT Pub. No.: WO2021/141404
PCT Pub. Date: Jul. 15, 2021

(65) Prior Publication Data
US 2023/0403114 A1    Dec. 14, 2023

(30) Foreign Application Priority Data

Jan. 7, 2020  (KR) .................. 10-2020-0002096
Jan. 29, 2020 (KR) .................. 10-2020-0010247

(51) Int. Cl.
*H04L 5/00* (2006.01)
(52) U.S. Cl.
CPC ................ *H04L 5/0051* (2013.01)
(58) Field of Classification Search
CPC ..... G01S 5/0009; G01S 5/0284; H04L 5/0051
See application file for complete search history.

(56) References Cited

U.S. PATENT DOCUMENTS 9,541,632 B2   1/2017  Frank et al.
11,540,089 B1 * 12/2022 Balasubramanian ..... G01S 5/10
(Continued)

FOREIGN PATENT DOCUMENTS

JP        5115357     1/2013
KR      101191215    10/2012
(Continued)

OTHER PUBLICATIONS

Qualcomm Incorporated, "Stage 2 for Multi-RTT positioning," 3GPP TSG-RAN WG2 Meeting #108, R2-1915558, Reno, Nevada, USA, Nov. 18-22, 2019, 19 pages.
(Continued)

*Primary Examiner* — Yee F Lam
(74) *Attorney, Agent, or Firm* — Fish & Richardson P.C.

(57) ABSTRACT

A first device receives information related to an absolute location of a positioning reference from the positioning reference; obtains a first PRS reception timing based on a positioning reference signal (PRS) received from the positioning reference; obtains a second PRS reception timing at which a second device receives the PRS from the positioning reference, based on a phase difference value between first RSs received on first subcarriers from the second device; obtains a third PRS reception timing at which a third device receives the PRS from the positioning reference, based on a phase difference value between second RSs received on second subcarriers from the third device; estimates a relative location of the positioning reference, based on the first PRS reception timing, the second PRS reception timing, and the third PRS reception timing; and obtains location information of the first device based on the absolute location and the relative location.

14 Claims, 24 Drawing Sheets

(56) References Cited

U.S. PATENT DOCUMENTS

| | | | |
|---|---|---|---|
| 2009/0323642 A1* | 12/2009 | Tanno | H04L 27/2627 |
| | | | 370/336 |
| 2012/0257575 A1* | 10/2012 | Davydov | H04W 24/02 |
| | | | 370/328 |
| 2015/0168532 A1 | 6/2015 | Hampel et al. | |
| 2016/0165398 A1* | 6/2016 | Seo | H04W 56/0065 |
| | | | 455/456.6 |
| 2017/0034688 A1* | 2/2017 | Kim | G01S 5/26 |
| 2019/0182794 A1* | 6/2019 | Wong | H04W 52/0216 |
| 2019/0364536 A1 | 11/2019 | Sadiq et al. | |
| 2020/0212990 A1* | 7/2020 | Kurras | H04W 64/003 |
| 2021/0160656 A1* | 5/2021 | Choi | H04W 4/023 |
| 2022/0043099 A1* | 2/2022 | Da | H04L 5/0048 |
| 2022/0174655 A1* | 6/2022 | Tsai | H04W 72/20 |
| 2022/0295442 A1* | 9/2022 | Goyal | H04W 64/00 |
| 2022/0353842 A1* | 11/2022 | Priyanto | H04W 64/00 |

FOREIGN PATENT DOCUMENTS

| | | |
|---|---|---|
| KR | 101527041 | 6/2015 |
| WO | WO 2016/048509 | 3/2016 |

OTHER PUBLICATIONS

3GPP TR 37.857 V13.1.0 (Dec. 2015), 3rd Generation Partnership Project Technical Specification Group Radio Access Network, Study on indoor positioning enhancements for UTRA and LTE (Release 13), Dec. 2015, 82 pages.

Extended European Search Report in European Appln. No. 21738950. 1, mailed on Jan. 5, 2024, 12 pages.

* cited by examiner

FIG. 4
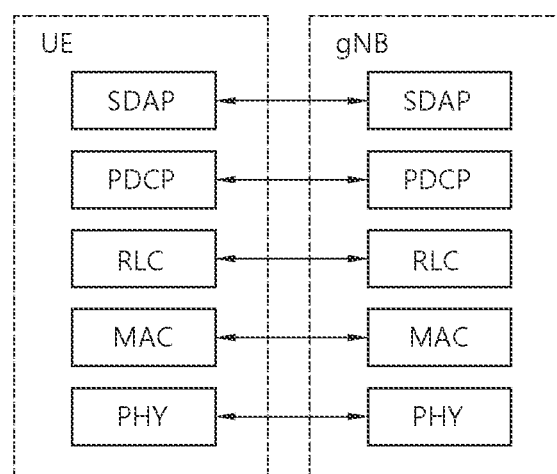
(a)
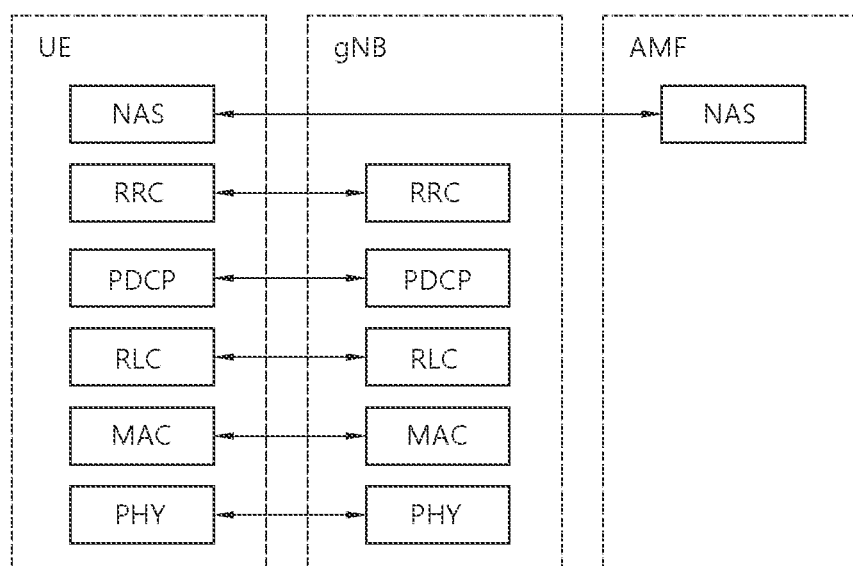
(b)

FIG. 8
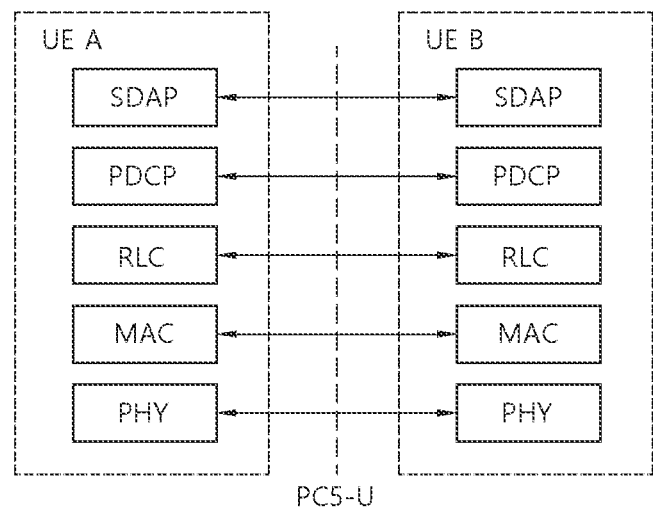
(a)
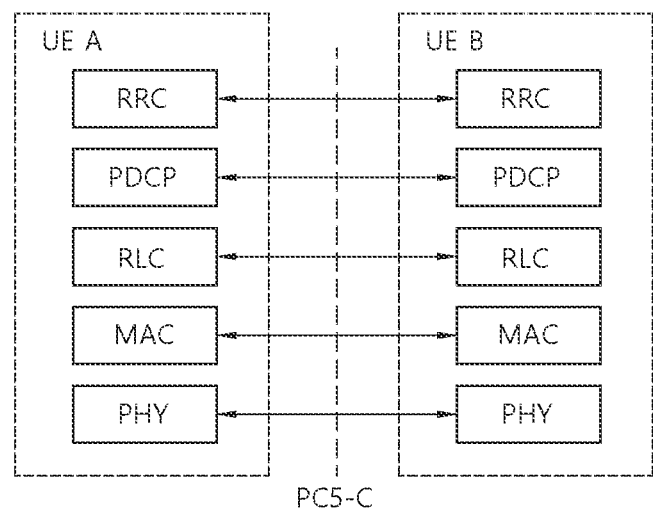
(b)

METHOD AND APPARATUS FOR PERFORMING SIDELINK-BASED POSITIONING

CROSS-REFERENCE TO RELATED APPLICATIONS

This application is a National Stage application under 35 U.S.C. § 371 of International Application No. PCT/KR2021/000186, filed on Jan. 7, 2021, which claims the benefit of Korean Patent Application No. 10-2020-0002096, filed on Jan. 7, 2020 and Korean Patent Application No. 10-2020-0010247, filed on Jan. 29, 2020. The disclosures of the prior applications are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM(Basic Safety Message), CAM(Cooperative Awareness Message), and DENM(Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, positioning method based on location server using existing Uu link needs 3 or more base stations as a positioning reference that accurately knows the absolute position for estimating a position of a UE. But, In SL communication, the condition in which a UE always sends and receives signals with three or more base stations may not always be satisfied. Therefore, a terminal performing SL communication may not be able to apply a TDOA-based positioning method. Therefore, there is a need to propose a positioning method for performing positioning based on one positioning reference and an apparatus supporting the same.

Technical Solutions

In an embodiment, a method for a first apparatus to perform wireless communication is provided. The method may comprise: receiving information related to an absolute position of a positioning reference, from the positioning reference; obtaining a first positioning reference signal (PRS) reception timing, based on a PRS received from the positioning reference; obtaining a second PRS reception timing at which a second apparatus receives the PRS from the positioning reference, based on a phase difference value between first RSs received on first subcarriers from the second apparatus; obtaining a third PRS reception timing at which a third apparatus receives the PRS from the positioning reference, based on a phase difference value between second RSs received on second subcarriers from the third apparatus; estimating a relative position of the positioning reference, based on the first PRS reception timing, the second PRS reception timing, and the third PRS reception timing; and obtaining position information of the first apparatus, based on the absolute position and the relative position.

EFFECTS OF THE DISCLOSURE

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
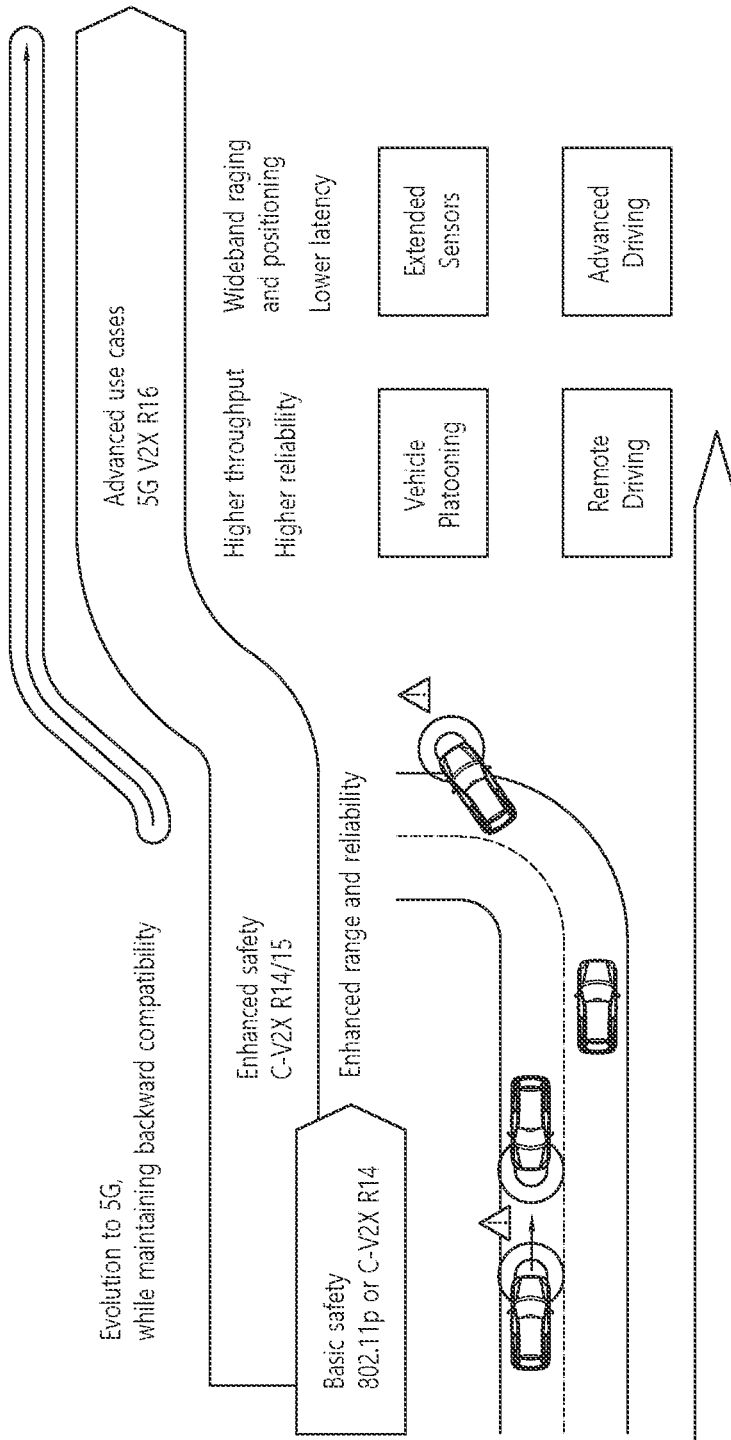
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
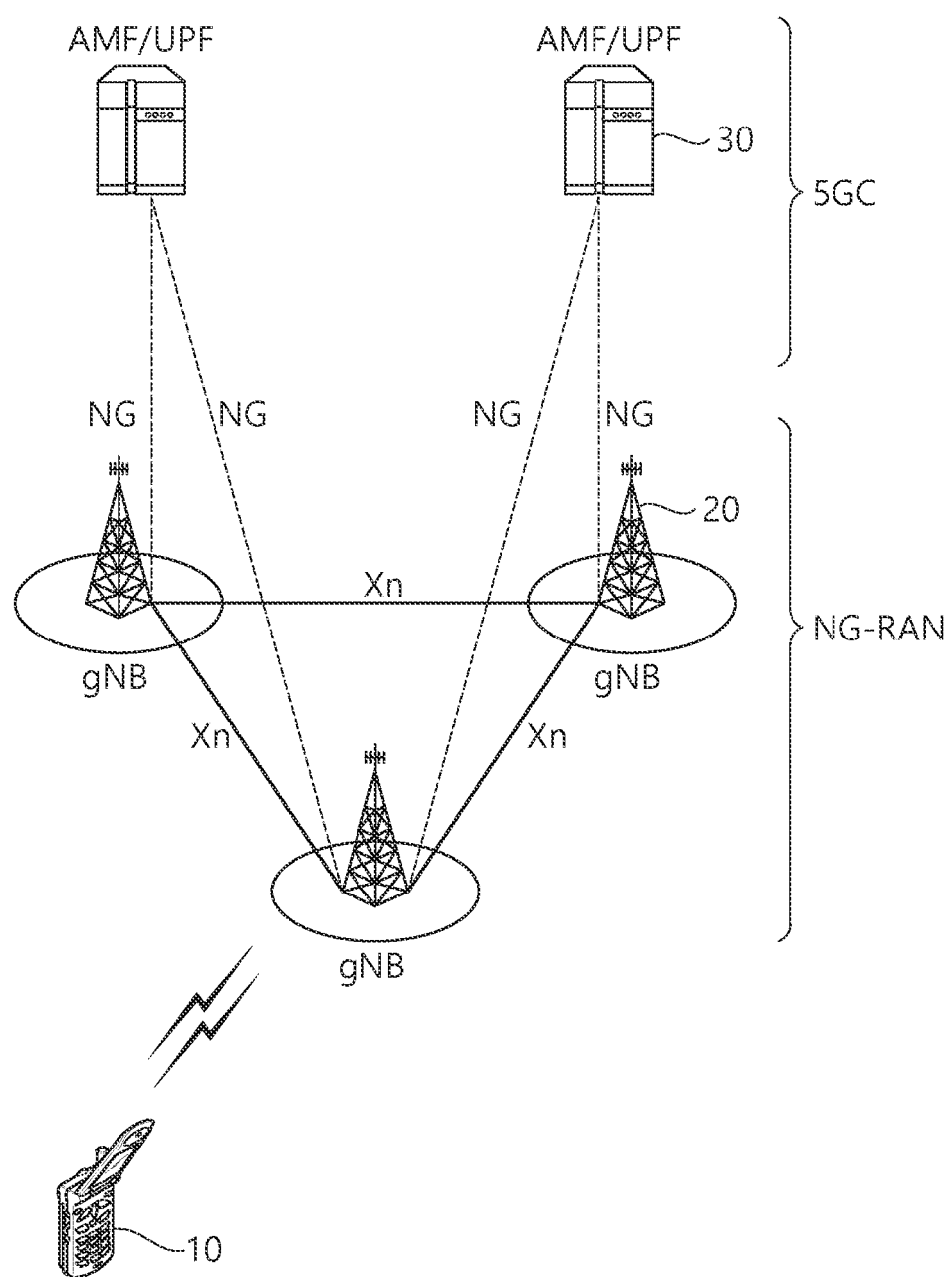
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation—radio access network (NG-RAN) may include a BS providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
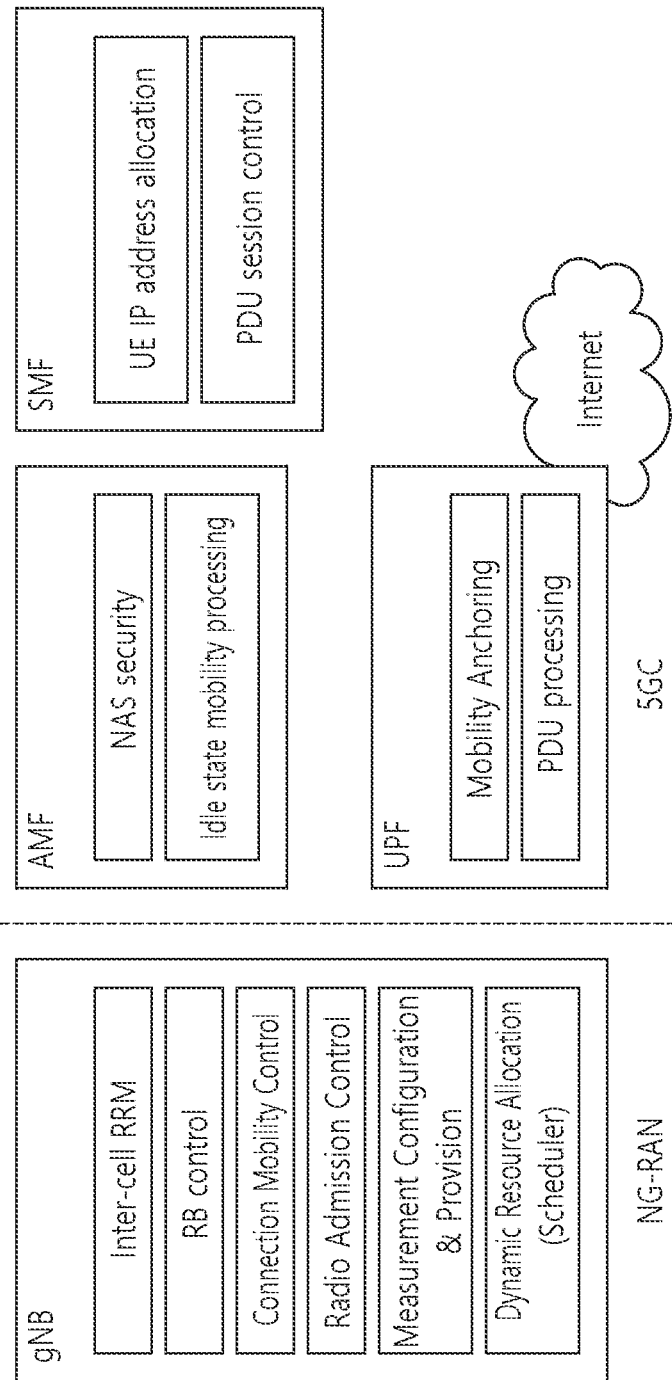
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages. Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
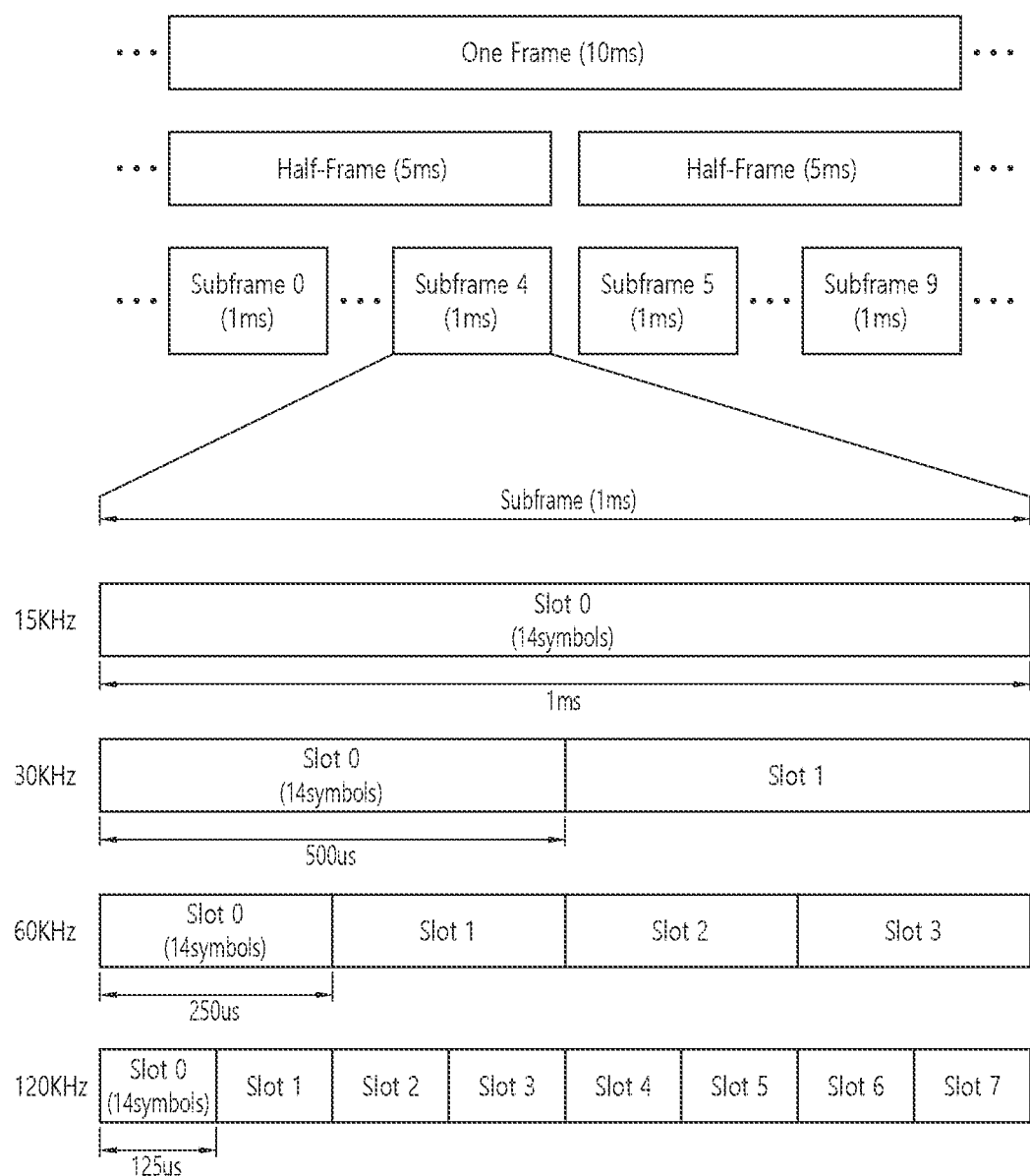
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe}_{slot}$) in accordance with an SCS configuration (u), in a case where a normal CP is used.

TABLE 1

| SCS ($15 * 2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
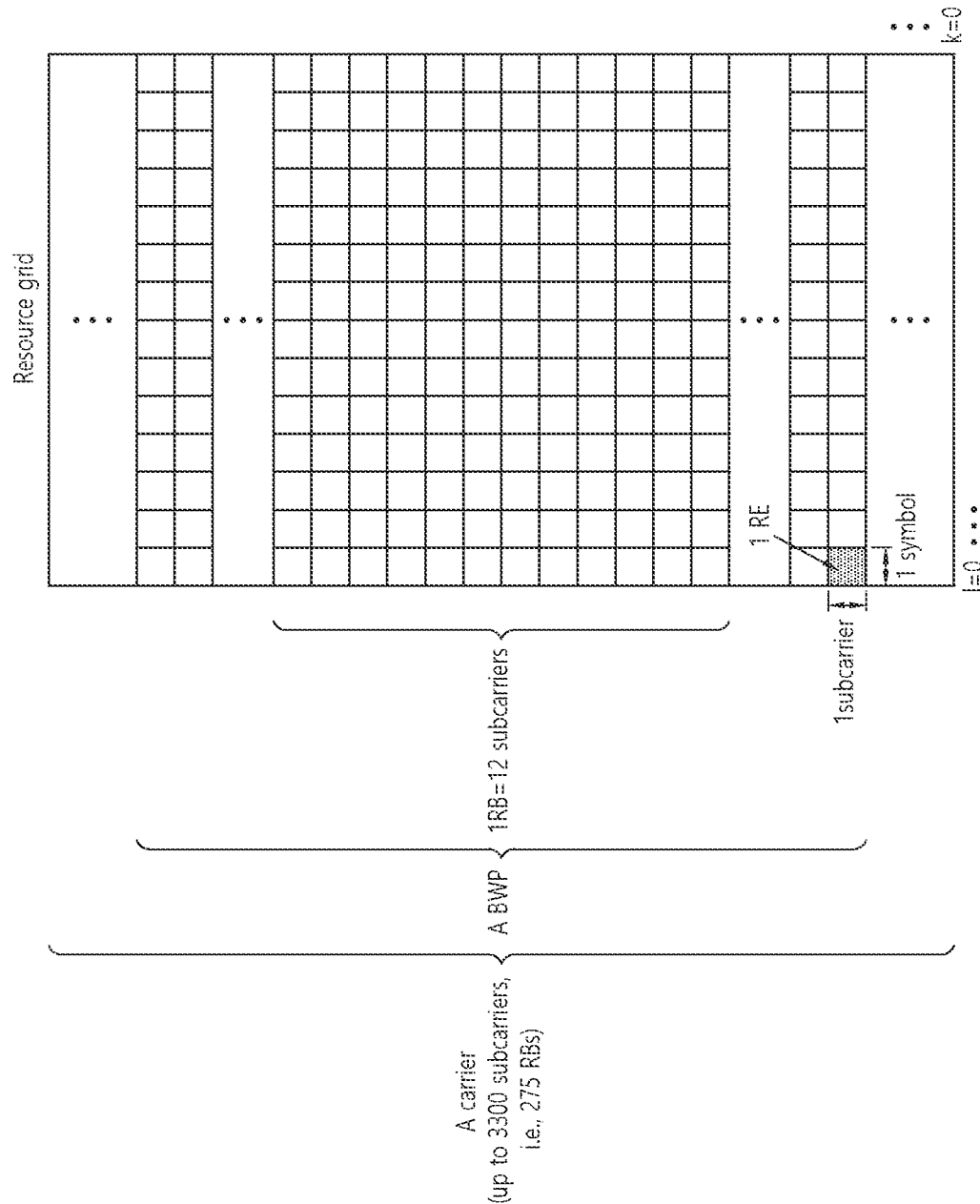
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC IDLE UE. For the UE in the RRC CONNECTED mode, at least one SL BWP may be activated in the carrier.

Figure 7:
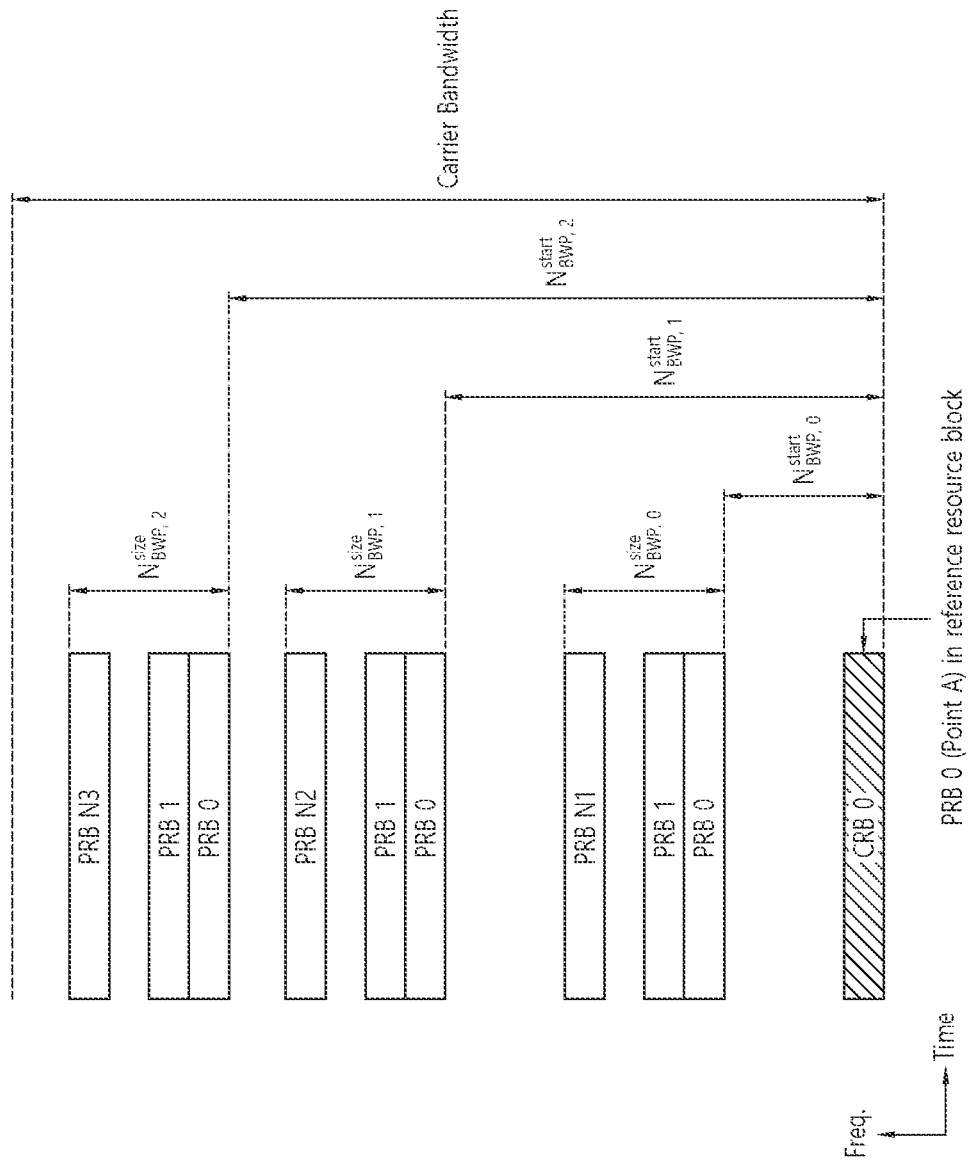
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRB s in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
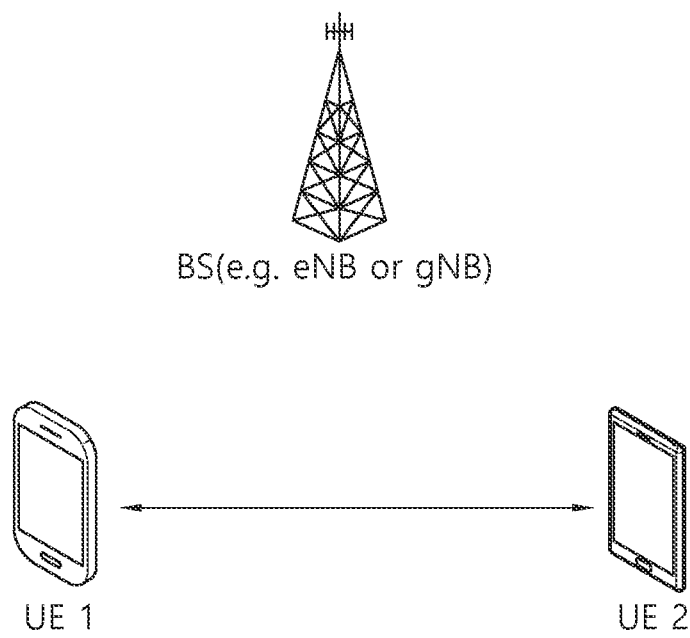
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
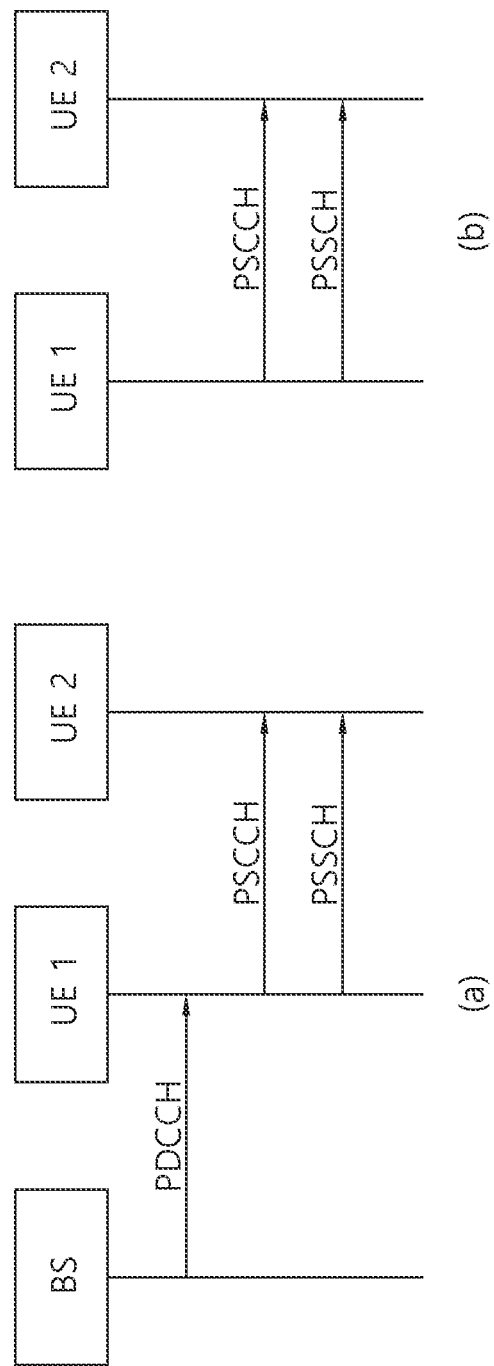
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PS SCH.

Hereinafter, positioning will be described.

Figure 11:
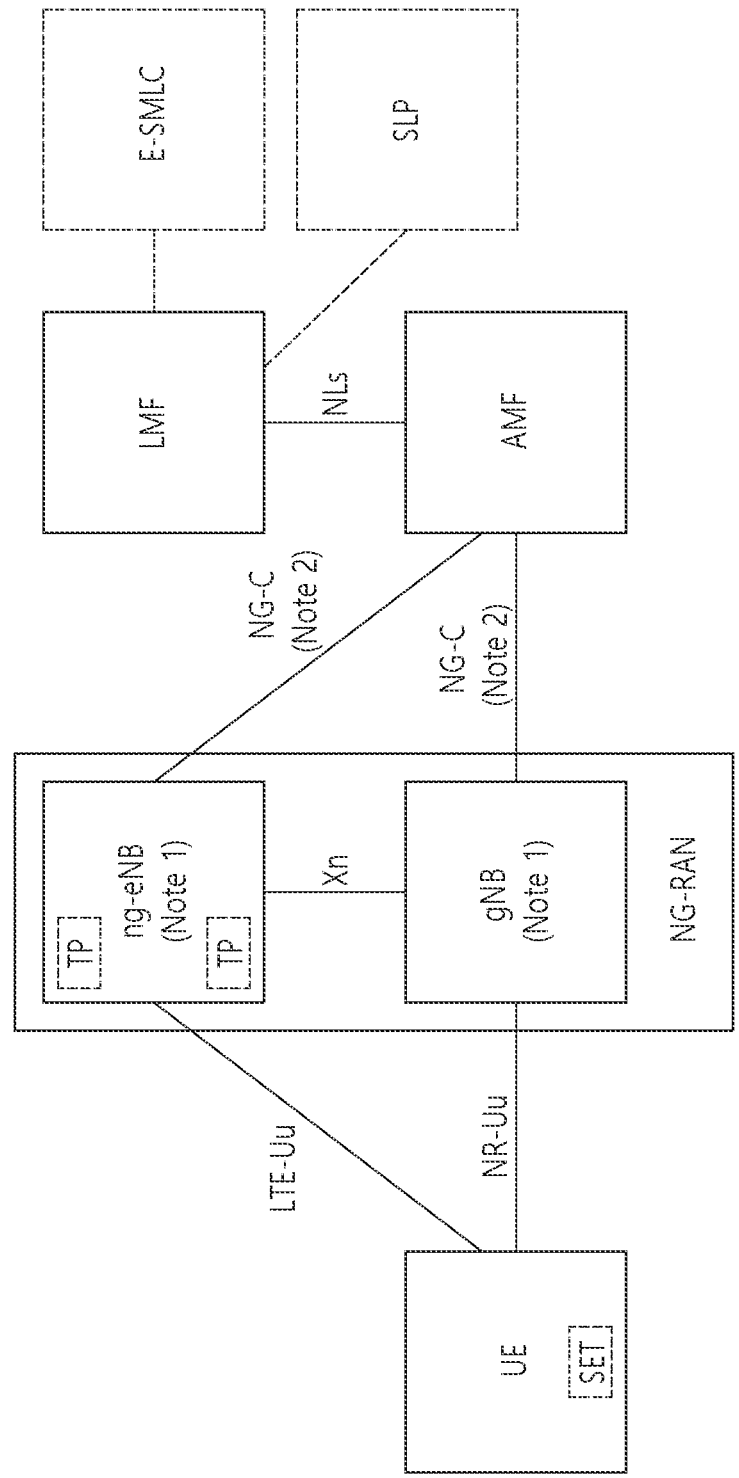
FIG. 11 shows an example of an architecture of a 5G system capable of positioning a UE having access to a next generation-radio access network (NG-RAN) or an E-UTRAN based on an embodiment of the present disclosure.

FIG. 11 shows an example of an architecture of a 5G system capable of positioning a UE having access to a next generation-radio access network (NG-RAN) or an E-UTRAN based on an embodiment of the present disclosure. The embodiment of FIG. 11 may be combined with various embodiments of the present disclosure.

Referring to FIG. 11, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 12:
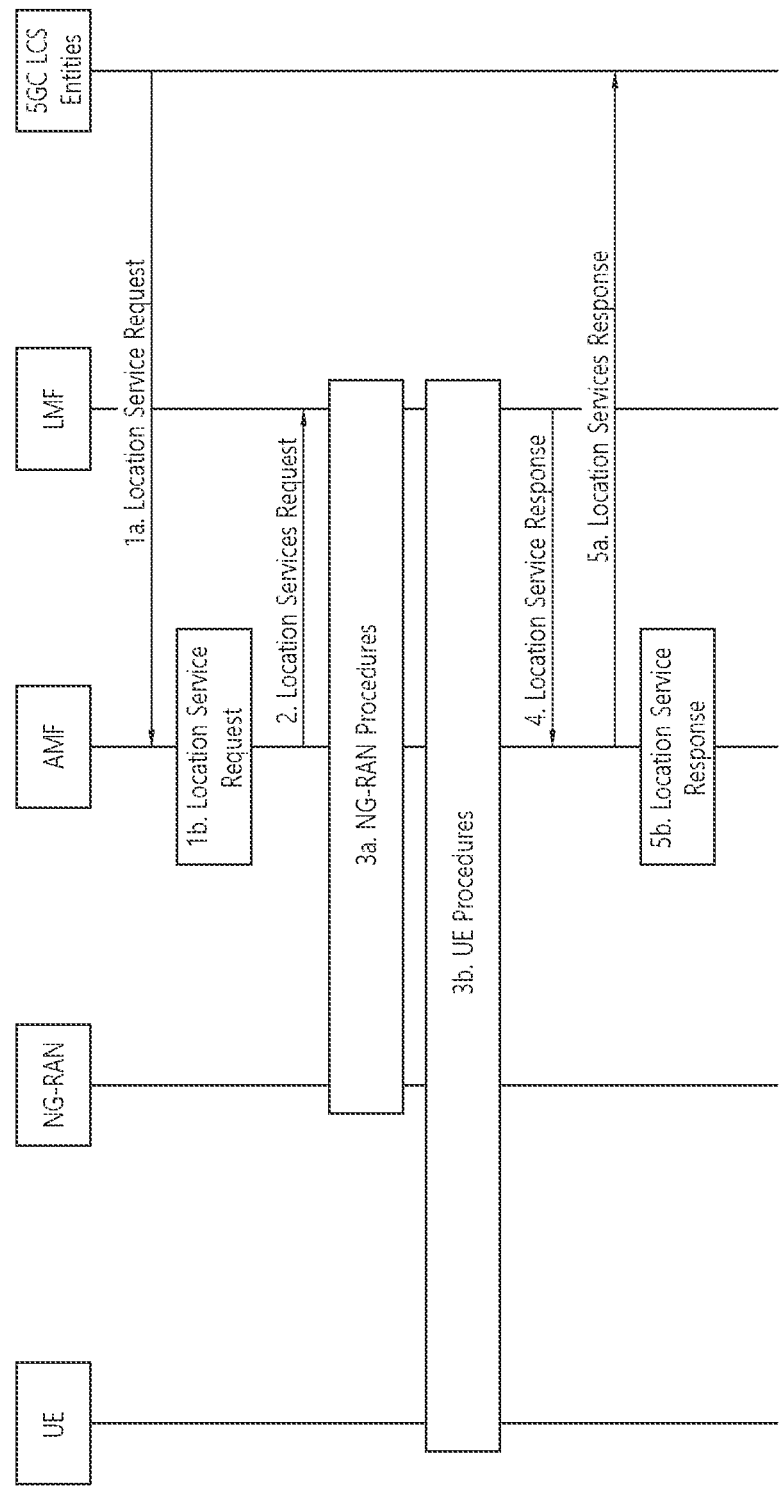
FIG. 12 shows an example of implementing a network for measuring a location of a UE based on an embodiment of the present disclosure.

FIG. 12 shows an example of implementing a network for measuring a location of a UE based on an embodiment of the present disclosure. The embodiment of FIG. 12 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 12. That is, it may be assumed in FIG. 12 that the UE is in a connected mode. However, due to signaling and data inactivation or the like, the signaling connection may be released by NG-RAN while a positioning process is performed.

A network operation process for measuring a location of a UE will be described in detail with reference to FIG. 12. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information regarding whether location estimation of the UE is successful and a location estimation value of the UE. Thereafter, if the procedure of FIG. 12 is initiated by step a1, the AMF may transfer the location service response to a 5GC entity such as GMLC, and if the procedure of FIG. 12 is initiated by step 1b, the AMF may use the location service response to provide a location service related to an emergency call or the like.

Figure 13:
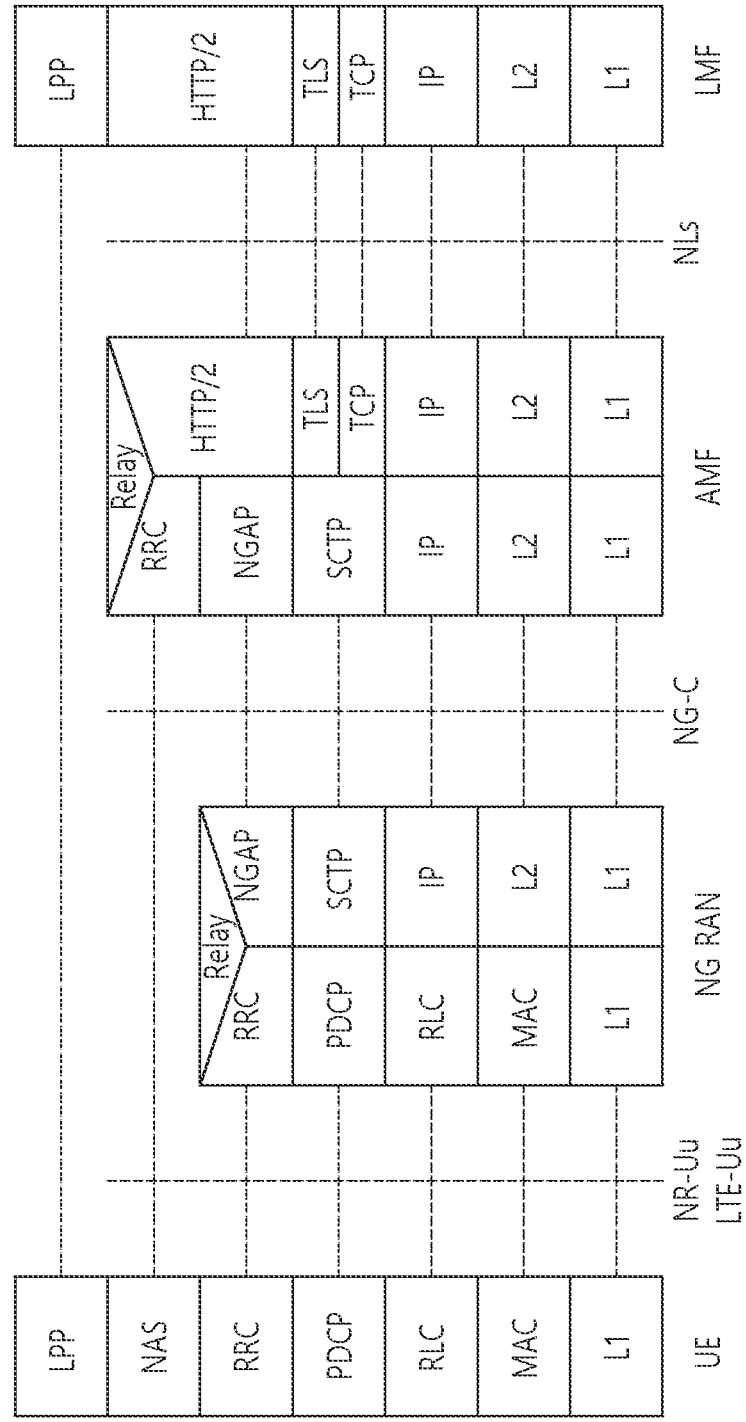
FIG. 13 shows an example of a protocol layer used to support LTE positioning protocol (LPP) message transmission between an LMF and a UE based on an embodiment of the present disclosure.

FIG. 13 shows an example of a protocol layer used to support LTE positioning protocol (LPP) message transmission between an LMF and a UE based on an embodiment of the present disclosure. The embodiment of FIG. 13 may be combined with various embodiments of the present disclosure.

An LPP PDU may be transmitted through a NAS PDU between an AMF and the UE. Referring to FIG. 13, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or position information. In addition, an LPP message may be used to indicate exchange of error information and/or interruption of the LPP procedure.

Figure 14:
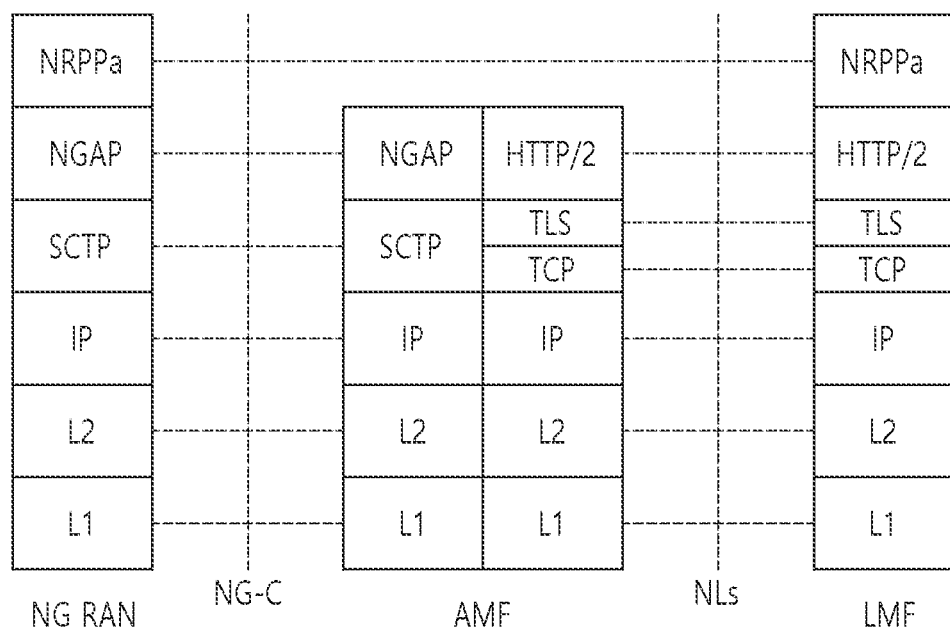
FIG. 14 shows an example of a protocol layer used to support NR positioning protocol A (NRPPa) PDU transmission between an LMF and an NG-RAN node based on an embodiment of the present disclosure.

FIG. 14 shows an example of a protocol layer used to support NR positioning protocol A (NRPPa) PDU transmission between an LMF and an NG-RAN node based on an embodiment of the present disclosure. The embodiment of FIG. 14 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information regarding an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information regarding a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference of Arrival)

Figure 15:
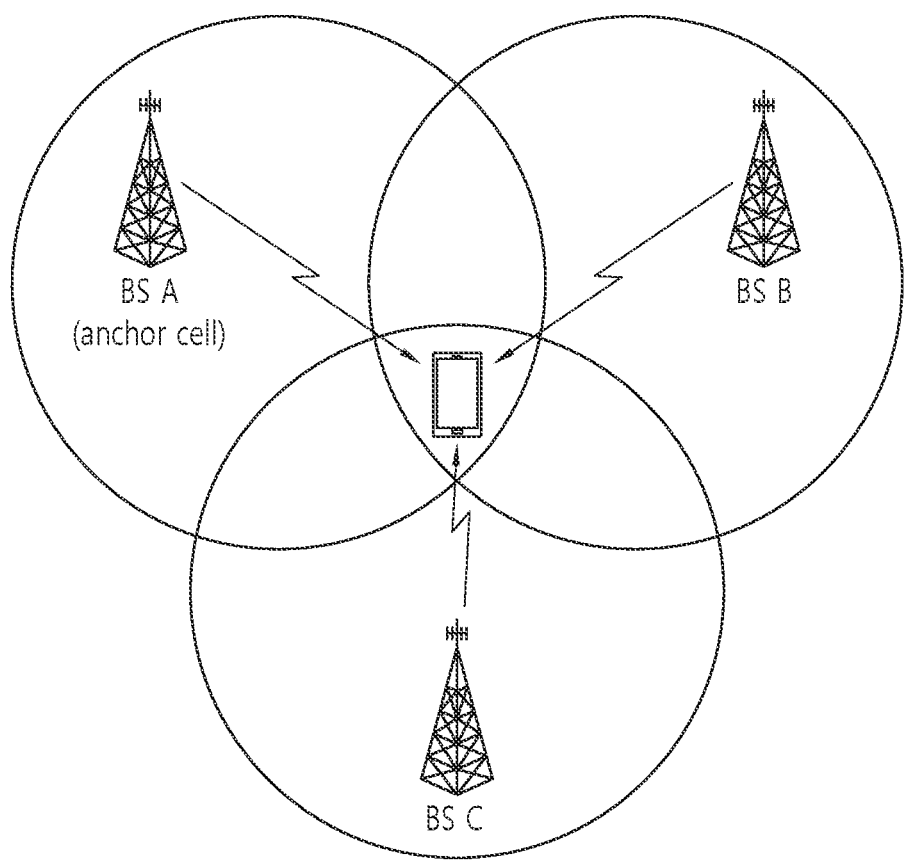
FIG. 15 is a drawing for explaining an OTDOA positioning method based on an embodiment of the present disclosure.

FIG. 15 is a drawing for explaining an OTDOA positioning method based on an embodiment of the present disclosure. The embodiment of FIG. 15 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad [\text{Equation 1}]$$

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti-T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

On the other hand, the conventional positioning performs positioning of a UE based on a reference point that knows the absolute position in advance. For example, in the case of OTDOA, a location server knows the location of base stations, the location server may estimate the absolute location of a UE based on the location of the base stations and the time distance difference (i.e., RSTD) for the PRS received by the UE from a plurality of base stations. However, in the case of a UE (e.g., a vehicle) moving on a road, a case in which a PRS transmitted by the number of base stations required for OTDOA does not reach the UE may frequently occur. Alternatively, in the case of a UE (e.g., a vehicle) moving outside the coverage of a base station, the UE may not receive a PRS transmitted by the base stations. In this case, the UE (e.g., vehicle) or location server may perform OTDOA based on an RSU whose absolute location is known. However, there may be a case where the number of RSUs required to perform OTDOA also does not exist around a UE, or an RSU does not exist around the UE. In this case, a UE or a location server cannot use the OTDOA positioning technique based on a reference point for performing the existing positioning.

For the above reason, for example, outside the coverage of a base station, UEs (e.g., vehicles) may perform positioning based on GNSS. However, in this case, the distance between a UE and an artificial satellite is very long, and thus the signal strength is not strong, so that the GNSS-based positioning is greatly affected by the channel environment or weather. Accordingly, UEs are able to obtain only position information having a certain degree of positioning error.

In order to solve the above-described problem, according to various embodiments of the present disclosure, a method for more accurately estimating the location of a UE and an apparatus supporting the same may be proposed, by UEs capable of estimating position information having an estimation error mutually sharing a relative distance measurement value for a specific landmark on a road whose absolute location is not known in advance. Hereinafter, for convenience of description, a vehicle is mainly described, but various embodiments of the present disclosure are not limitedly applied to a device called a vehicle. For example, various embodiments of the present disclosure may be applied or implemented with respect to at least one device described in FIGS. W1 and X1 to X9.

For example, a vehicle may select or determine any nearby object that can be used as a landmark for positioning. For example, a vehicle may use one or more objects that are uniquely recognizable without being confused with other surrounding objects, such as a specific building, traffic sign, or structure, as landmarks for positioning. An important point is that a landmark selected by a vehicle is an object whose absolute location cannot be known in advance, unlike a reference point for performing positioning in the past.

For example, any vehicle may use radar, lidar, camera, and/or sensor, etc., to perform relative positioning for a selected landmark. Through this, a vehicle may obtain or determine a relative positioning estimation value for the selected landmark. In this case, it is assumed that each vehicle may obtain or determine information regarding its absolute position (e.g., an absolute position estimation value) through GNSS, etc., and the obtained absolute position information includes an estimation error. In this case, for example, a vehicle may estimate the absolute position of a landmark by using its absolute position estimation value and the relative positioning estimation value for the landmark. That is, a vehicle may obtain or determine information regarding the absolute position of the landmark (e.g., an absolute position estimation value) by using its absolute position estimation value and the relative position estimation value for the landmark. In addition, a vehicle may transmit information regarding the absolute position of the landmark to one or more nearby vehicles. Accordingly, information regarding the absolute position of the landmark selected by the vehicle may be shared with vehicles located in the vicinity of the vehicle.

Alternatively, for example, there may be a case in which an anchor entity exists. For example, the anchor entity may be an entity having a capability of collecting data transmitted by one or more surrounding vehicles, aggregating the collected data and transmitting the data again. In this case, a vehicle may transmit an absolute position estimation value for the landmark estimated by the vehicle to the anchor entity. In this case, the anchor entity may be a specific UE, such as a base station, an RSU, or a vehicle having related capabilities.

For example, a specific vehicle in which an absolute position estimation value for a landmark estimated by other vehicles is shared from a neighboring vehicle or the anchor entity may calculate or obtain the absolute position of the landmark with reduced estimation error, by using the absolute position estimation value of the landmark estimated by the same method and the shared absolute position estimation value. For example, when the specific vehicle calculates or obtains an average value of the absolute position estimation value of all vehicles shared with the specific vehicle and the absolute position estimation value estimated by the specific vehicle, and the estimation error of each vehicle has a random value and the stochastic distribution of the estimation error value has a Gaussian distribution, theoretically, the error converges to a value of 0, and the more the number of vehicles sharing the estimation value, the smaller the estimation error. Or, the estimation error can be reduced by a specific vehicle calculating a median value of the absolute position estimation values for a landmark, or by the specific vehicle calculating the average or median values with values excluding the maximum and the minimum values, or by applying the above method to only estimation values excluding outliers.

After a vehicle reduces the estimation error for the absolute position estimation value for a landmark and more accurately estimates the absolute position for the landmark by the method described above, the vehicle may reduce an estimation error of its existing absolute position estimation value estimated based on GNSS or the like based on the high-accuracy absolute position estimation value for the landmark. That is, for a landmark having an absolute position estimated with high accuracy, a vehicle may estimate the relative position from the landmark by performing relative positioning using radar/lidar/camera/sensor or the like. In addition, the vehicle may use this value to correct the previously estimated absolute position estimation value of the vehicle itself In order to perform the method proposed above, a UE (e.g., vehicle) may perform the following operation.

1) A UE may select or determine any landmark.

2) The UE may directly share information regarding the selected landmark with one or more neighboring UEs. Alternatively, an anchor entity may receive information regarding the landmark from the UE, and the anchor entity may transmit/share information regarding the landmark to one or more neighboring UEs.

For example, landmark information may be image data obtained through a camera or a sensor. For example, information regarding a landmark may be a name that can represent the landmark, such as a business name for a building. For example, information regarding a landmark may be a specific feature or parameter that can uniquely determine the characteristic of the object, such as size, color, and outline.

For example, a UE may share information regarding a landmark with neighboring UEs through higher layer signaling such as PC5-RRC signaling. For example, a UE may share information regarding a landmark with neighboring UEs through SL MAC CE or SCI signaling.

For example, a UE may transmit information regarding a landmark to an anchor entity (eg, UE-type RSU or UE) through higher layer signaling such as PC5-RRC signaling. For example, the anchor entity may transmit/share information regarding a landmark to neighboring UEs through higher layer signaling such as PC5-RRC signaling. For example, an anchor entity may transmit/share information regarding a landmark to neighboring UEs through SL MAC CE or SCI signaling.

For example, a UE may transmit information regarding a landmark to an anchor entity (e.g., NB-type RSU or a base station) through higher layer signaling such as RRC signaling. For example, a UE may transmit information regarding a landmark to an anchor entity through PUCCH signaling. For example, an anchor entity may transmit/share information regarding a landmark to neighboring UEs through higher layer signaling such as RRC signaling. For example, an anchor entity may transmit/share information regarding a landmark to neighboring UEs through MAC CE or DCI signaling.

3) The UE may obtain or determine a relative position estimation value of the landmark by performing relative positioning on the selected landmark. Then, the UE may obtain or determine the absolute position estimation value of the landmark based on the relative position estimation value of the landmark and the UE's own absolute position estimation value.

4) The UE may share the absolute position estimation value of the landmark directly with one or more neighboring UEs. Alternatively, an anchor entity may receive, from all neighboring UEs, the absolute position estimation value of a landmark determined respectively by all neighboring UEs, and the anchor entity may transmit/share the aggregated absolute position estimation value to all neighboring UEs.

For example, a UE may share the absolute position estimation value of a landmark with neighboring UEs through higher layer signaling such as PC5-RRC signaling. For example, a UE may share the absolute position estimation value of a landmark with neighboring UEs through SL MAC CE or SCI signaling.

For example, a UE may transmit the absolute position estimation value of a landmark to an anchor entity (e.g., UE-type RSU or UE) through higher layer signaling such as PC5-RRC signaling. For example, the absolute position estimation value of a landmark estimated by neighboring UEs collected by an anchor entity may be transmitted/shared to the neighboring UEs through higher layer signaling such as PC5-RRC signaling. For example, the absolute position estimation value of a landmark estimated by neighboring UEs collected by an anchor entity may be transmitted/shared to the neighboring UEs through SL MAC CE or SCI signaling.

For example, a UE may transmit the absolute position estimation value of a landmark to an anchor entity (e.g., NB-type RSU or base station) through higher layer signaling such as RRC signaling. For example, a UE may transmit the absolute position estimation value of a landmark to an anchor entity through PUCCH signaling. For example, the absolute position estimation value of a landmark estimated by neighboring UEs collected by an anchor entity may be transmitted/shared to the neighboring UEs through higher layer signaling such as RRC signaling. For example, the absolute position estimation value of a landmark estimated by neighboring UEs collected by an anchor entity may be transmitted/shared to the neighboring UEs through MAC CE or DCI signaling.

5) By using the shared absolute position estimation value of a landmark obtained/determined by other UEs and the absolute position estimation value of the landmark it has estimated, the UE may determine/obtain the absolute position estimation value of the landmark with reduced estimation error.

6) The UE may perform relative positioning on a landmark having an absolute position estimation value with a reduced estimation error. In this way, the UE can reduce the error of the UE's own absolute position estimation value previously estimated and correct the absolute position value of the UE more accurately.

According to various embodiments of the present disclosure, when the number of base stations or RSUs as a positioning reference point that can know an absolute position in advance in order to perform a TDOA positioning technique is insufficient or does not exist, a method of improving the absolute positioning accuracy of a landmark and finally improving the absolute positioning accuracy of the UE itself based on the improved absolute positioning estimation value of the landmark, by sharing the absolute positioning estimation value for the landmark of each vehicle among the UEs after the UE selects an arbitrary landmark was proposed.

On the other hand, for positioning based on SL communication, an SL entity may transmit RS for positioning. For example, an SL entity may be a UE, a UE-type RSU, or a base station, or the like. Hereinafter, an RS for positioning may be referred to as S-PRS. For example, an S-PRS may be a PRS or SRS in which a location server transmits scheduling/control information through a Uu link so that a UE transmits it for positioning. For example, an S-PRS may be an S-SSB signal transmitted to synchronize time between UEs. For example, an S-PRS may be a reference signal such as a DM-RS, a Channel State Information RS (CSI-RS), a Cell Specific RS (CRS), a Tracking RS (TRS), or a Phase Tracking RS (PT-RS).

At this time, for example, another SL entity such as a base station, a location server, or a UE may configure or pre-configure parameters related to transmission of an S-PRS to a UE transmitting the S-PRS through higher layer signaling. Or, for example, another SL entity such as a base station, a location server, or a UE may transmit/signal to a UE transmitting the S-PRS, parameters related to the transmission of the S-PRS through DCI or MAC CE. Or, for example, rather than having a base station or a location server (pre-)configures the parameters necessary for S-PRS transmission to a UE, a UE may adaptively configure parameters related to S-PRS transmission based on rules determined according to the state of the communication channel or the movement speed of a UE.

In the following description, a UE requiring a positioning service is described as a target UE (hereinafter, T-UE), and a neighboring UE participating in a positioning procedure to support positioning of a T-UE is described as a server UE (hereinafter, S-UE).

A TDOA-based positioning method based on a location server using an existing Uu link requires three or more base stations as a positioning reference that accurately knows the absolute location in order to estimate the location of a UE. That is, based on the reception timing difference (RSTD) of a UE for PRSs transmitted from three or more base stations, a location server may estimate the location of the UE. Alternatively, a location server may estimate the location of a UE based on a reception timing difference (RSTD) between base stations for SRS transmitted by the UE to three or more base stations.

However, in SL communication, the condition that a UE always transmits and receives signals with three or more base stations may not always be satisfied. Furthermore, a UE located outside a coverage of a base station may not detect even one base station. Therefore, a UE performing SL communication may not be able to apply a TDOA-based positioning method.

In order to solve the problem of requiring three or more positioning reference for TDOA-based positioning like the existing method, hereinafter, according to various embodiments of the present disclosure, an SL TDOA method for performing positioning based on one positioning reference and an apparatus supporting the same are proposed. In this case, for example, a positioning reference may include at least one of a base station, a transmission point (TP), and/or an RSU (UE-type RSU or eNB/gNB-type RSU). As an embodiment, considering the SL positioning to be applied to a vehicle, since a UE can use an RSU located on a road outside the coverage of a base station as a positioning reference, the UE may perform positioning by applying the method proposed according to various embodiments of the present disclosure. Meanwhile, various embodiments of the present disclosure may be applied to positioning based on Uu link communication as well as positioning based on SL communication.

In various embodiments of the present disclosure, a case in which a vehicle UE traveling on a road can see only one RSU will be described. In this case, the vehicle UE may be a T-UE that intends to measure its own location, and the UE-type RSU on the road and vehicles around the T-UE may be S-UEs participating in positioning of the T-UE. For example, S-UEs participating in positioning of the T-UE may be determined by the following method.

Figure 16:
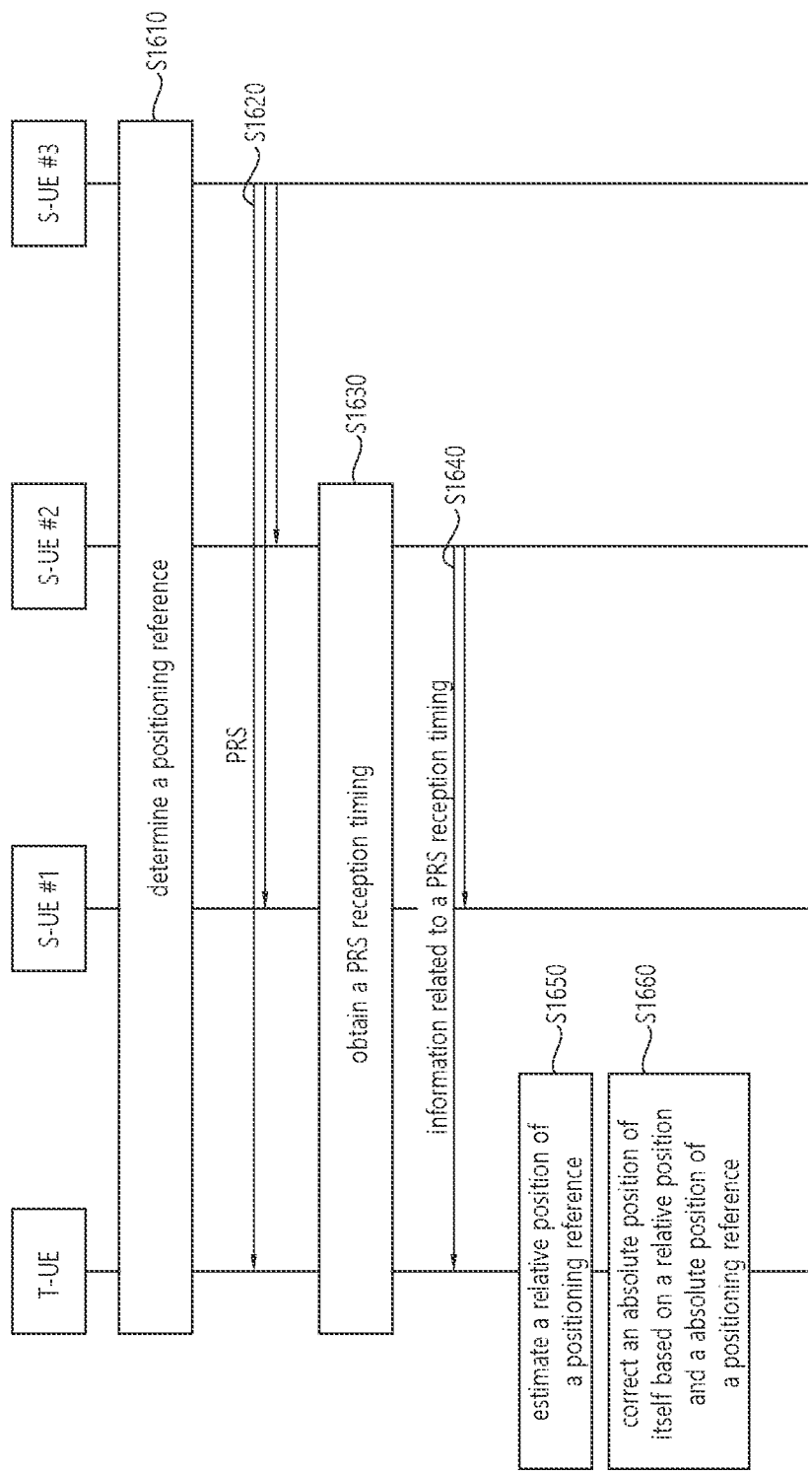
FIG. 16 shows a procedure in which a UE performs positioning, according to an embodiment of the present disclosure.

FIG. 16 shows a procedure in which a UE performs positioning, according to an embodiment of the present disclosure. The embodiment of FIG. 16 may be combined with various embodiments of the present disclosure.

Referring to FIG. 16, in step S1610, a positioning reference for positioning a T-UE may be determined. In the embodiment of FIG. 16, it is assumed that a positioning reference is determined as S-UE #3. For example, S-UE #3 may be a UE, an RSU or a base station. Hereinafter, various methods for determining a positioning reference for positioning of the T-UE will be described in detail.

For example, a location server or a base station may configure or pre-configure a positioning reference (e.g., RSU) and at least one S-UE to participate in the positioning of a T-UE, through a higher layer signaling. For example, a location server or a base station may transmit/signal to a positioning reference (e.g., RSU) and at least one S-UE to participate in the positioning of a T-UE through MAC CE, DCI, or the like. Accordingly, at least one S-UE participating in the positioning of a T-UE may be determined.

For example, a T-UE may request vehicles including the surrounding RSU to participate in its positioning, and the surrounding RSU or vehicles may accept the participation. Through this, at least one S-UE participating in the positioning of the T-UE may be determined. In this case, the request and the acceptance may be mutually transmitted/signaled through at least one of higher layer signaling (e.g., RRC signaling), MAC CE, and/or DCI.

For example, an RSU operating as a positioning reference on a road may periodically transmit a capability of transmitting an RS required to perform positioning to vehicles on a road. Or, for example, an RSU operating as a positioning reference on the road may (always) periodically transmit an RS required to perform positioning. In this case, the capability transmitted by the RSU may be transmitted/signaled to a T-UE and S-UEs through at least one of higher layer signaling (e.g., RRC signaling), MAC CE and/or DCI.

Through the above process, if at least one S-UE to participate in the positioning of a T-UE is determined, among an RSU or at least one S-UE, one that is required as a service requirement or secures its absolute position accuracy at a level higher than or equal to a threshold may operate as a positioning reference. For example, an S-UE may determine whether it is a UE capable of operating as a positioning reference based on a service requirement or threshold for location accuracy. For example, the threshold may be configured or pre-configure for an RSU or S-UE. For example, the RSU or S-UE may receive the threshold from a network or a base station. In addition, an S-UE determined as a positioning reference may transmit its absolute position to neighboring T-UE and other S-UEs. In this case, for example, a T-UE may know the absolute position of an RSU in advance. Or, for example, an S-UE operating as an RSU or positioning reference may transmit its absolute position to a T-UE and other S-UEs, through at least one of higher layer signaling (e.g., RRC signaling), MAC CE and/or DCI.

In step S1620, an RSU or S-UE operating as a positioning reference may transmit a positioning RS to neighboring T-UE or the remaining S-UE. And, in step S1630, a T-UE and at least one S-UE may measure the timing of receiving a positioning RS. And, in step S1640, at least one S-UE may transmit information regarding the timing at which it receives a positioning RS to the T-UE. In this case, at least one S-UE may transmit information regarding the timing at which it receives a positioning RS to the T-UE, through at least one of MAC CE and/or DCI.

In step S1605, based on the difference of a positioning RS reception timing (RSTD) of each S-UE received from at least one neighboring S-UE and the timing when the T-UE receives a positioning RS, the T-UE may estimate the location of a positioning reference (e.g., RSU or S-UE #3) using TDOA-based positioning.

In this case, a T-UE may measure its absolute orientation using a geomagnetic sensor. Also, for example, the T-UE may know the relative distance between the S-UE and the T-UE based on measurement through a sensor or the like. Or, for example, the T-UE and each S-UE may estimate their approximate position based on GPS, and an S-UE may transmit its position to the T-UE through at least one of higher layer signaling (e.g., RRC signaling), MAC CE, and/or DCI. Here, a T-UE receiving the position information from a S-UE may estimate the relative distance between the S-UE and the T-UE. Accordingly, the T-UE may determine both the relative positions/distances and absolute orientations of the surrounding S-UEs by using the geomagnetic sensor and a sensor that measures the relative position/distance.

For example, by determining the relative position/distance of the positioning reference from the T-UE and S-UEs through the TDOA-based positioning, and using the absolute orientation of a T-UE and S-UEs to remove ambiguity about the absolute orientation for a positioning reference, the absolute position of the positioning reference may be estimated from the absolute positions roughly estimated by the T-UE and the S-UE based on GPS. At this time, if the absolute coordinates for the absolute position shared by the positioning reference and the absolute position of the estimated positioning reference are compared, the estimation error for the absolute position of the positioning reference can be calculated, and using this estimation error, the T-UE's accurate absolute position can be obtained by correcting the approximate absolute position estimation value of the T-UE. That is, in step S1660, the T-UE may obtain an accurate absolute position by correcting its absolute position estimation value based on the relative position of the positioning reference and the absolute position of the positioning reference. A method for the T-UE to correct its absolute position estimation value may refer to FIG. 17.

Alternatively, in the above process, if a positioning reference reception timing is shared among all S-UEs participating in T-UE positioning, all S-UEs may also estimate their absolute positions using the positioning method. In this case, the reception timing may be exchanged/transmitted between all UEs including the T-UE and the S-UE through at least one of higher layer signaling (e.g., RRC signaling), MAC CE and/or DCI.

Figure 17:
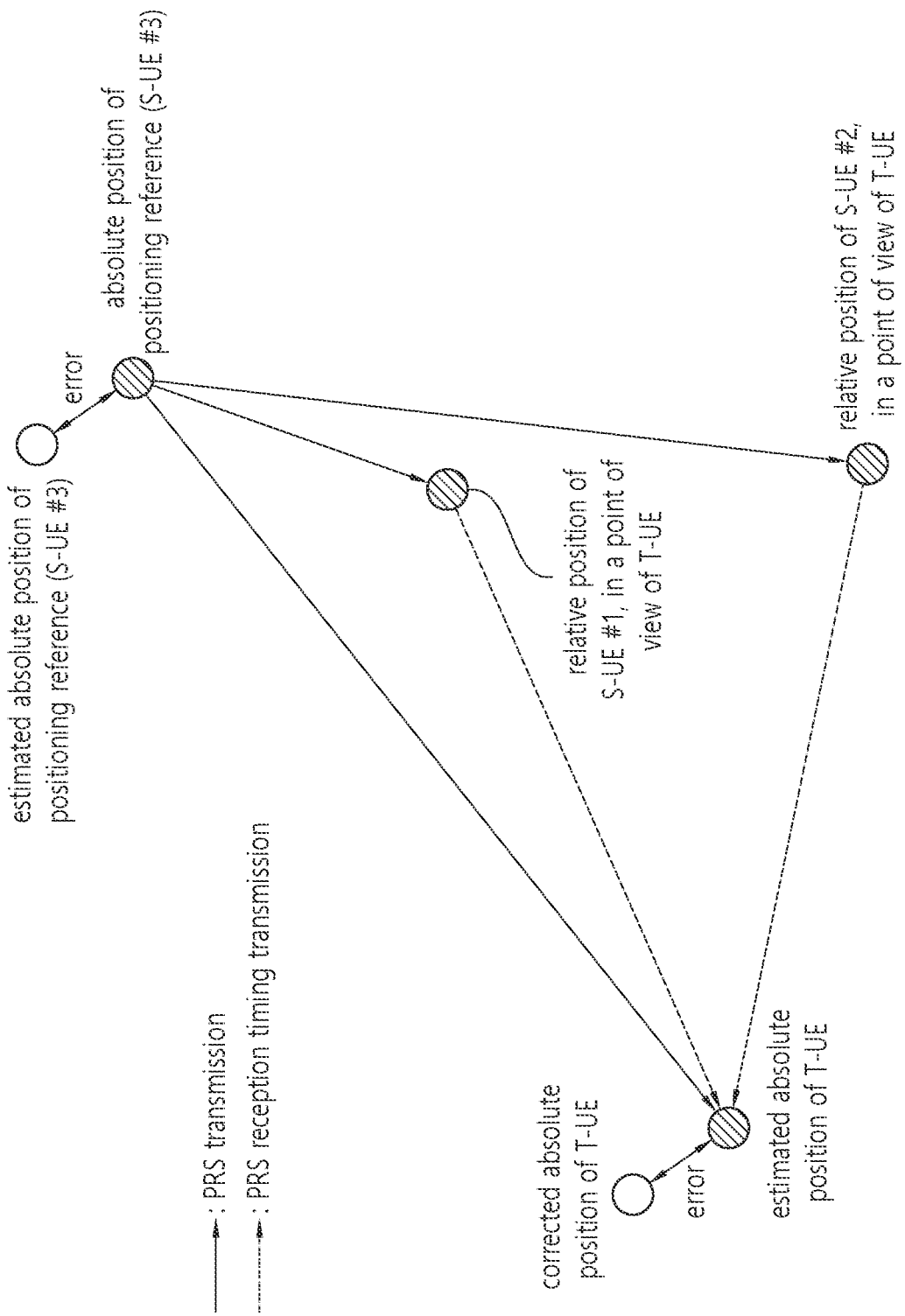
FIG. 17 shows a method for a T-UE to correct its absolute position estimation value, according to an embodiment of the present disclosure.

FIG. 17 shows a method for a T-UE to correct its absolute position estimation value, according to an embodiment of the present disclosure. The embodiment of FIG. 17 may be combined with various embodiments of the present disclosure.

Referring to FIG. 17, based on the procedure of FIG. 16 described above, a T-UE may estimate the absolute position of a positioning reference (S-UE #3). In this case, since the T-UE already knows the absolute position of the positioning reference (S-UE #3), the T-UE may correct its estimated absolute position by the corresponding error, by comparing the estimated absolute position of the positioning reference and the known absolute position of the positioning reference. Through this, the T-UE may obtain more accurate position information of its own.

The positioning method has high positioning accuracy when both an RSU and an S-UE participating in a T-UE positioning are temporally synchronized. However, when the time synchronization between UEs participating in the positioning does not match, an error occurs in an RSTD value, and finally, an error occurs in the positioning of the T UE. In order to solve this problem, when a reception timing is transmitted between S-UEs or an S-UE transmits the reception timing to a T-UE, a positioning error problem that may occur when the time synchronization is not matched can be solved by using the following new method.

In order to solve the problem of the time synchronization error, when S-UEs transmit positioning RS reception timing information received from a positioning reference (e.g., RSU) to a T-UE, the S-UEs may transmit the positioning RS reception timing information to the T-UE after a mutually known time offset between the T-UE and the S-UE. In this case, for example, the time offset value may be predefined. For example, a T-UE, RSU, base station or location server may configure or pre-configured a time offset value to an S-UE through at least one of higher layer signaling (e.g., RRC signaling), MAC CE and/or DCI. For example, a time offset value may be exchanged between an S-UE, a T-UE, an RSU, a base station or a location server.

In this way, if a T-UE receives a reception timing information for a positioning RS from an S-UE after the known time offset, in a time point where the T-UE receives the positioning RS reception timing information transmitted to the T-UE by the S-UE, the T-UE may estimate the timing value at which each S-UE receives the positioning RS by subtracting the time distance between the T-UE and the S-UE, calculated using the relative distance/position information between the T-UE and the S-UE measured through a sensor, etc. as described above, and the time offset value, in view of the timing reference of the T-UE. As mentioned above, the T-UE may estimate the position of a positioning reference based on the TDOA described above, by using the difference (RSTD) between the estimation value of the positioning RS reception timing of the S-UE and the timing value at which the T-UE itself receives the positioning RS. The subsequent process is the same as the method described above, and the T-UE can estimate the absolute position of the T-UE by comparing the estimated position of the positioning reference with the absolute position coordinates transmitted/shared by the positioning reference.

In the above description, the following method is possible for the method of transmitting timing information received by an S-UE to a T-UE after a certain time offset.

1) A method in which the S-UE transmits SCI including the timing value at which the S-UE receives a positioning RS, to a T-UE through a PSCCH.

2) A method where an S-UE transmits an additional RS to a T-UE, and transmits so that the phase values of two different subcarriers in the frequency domain of the RS are different by a timing value at which a positioning RS is received, and the T-UE restores the reception timing information of the positioning RS transmitted by the S-UE by measuring the phase difference between the two subcarriers. For example, two or more subcarriers may be used, and a final phase difference may be estimated, by estimating phase difference values from pairs of several subcarriers and averaging these values. In this case, for example, a transmission parameter for the additional RS transmitted by the S-UE to the T-UE, the number and subcarrier index of two or more subcarriers to which a phase difference is applied by a reception timing value may be predefined. For example, S-UE, RSU, base station or location server may configure or pre-configure a transmission parameter for the additional RS transmitted by the S-UE to the T-UE, the number and subcarrier index of two or more subcarriers to which a phase difference is applied by a reception timing value to the T-UE, through at least one of higher layer signaling (e.g., RRC signaling), MAC CE and/or DCI. For example, a transmission parameter for the additional RS transmitted by the S-UE to the T-UE, the number and subcarrier index of two or more subcarriers to which a phase difference is applied by a reception timing value may be exchanged between an S-UE, a T-UE, an RSU, a base station or a location server.

Using the proposed method as described above, even when the time synchronization between a positioning reference (e.g., RSU), an S-UE and a T-UE does not match, the T-UE may estimate its absolute position.

Meanwhile, when a UE performs SL communication based on a UL/SL shared carrier, an SL transmission resource does not always exist, but may vary according to the TDD UL/DL configuration. In this case, it may not be possible for all UEs to transmit time information after a common time offset. In this case, each S-UE may use a time offset that varies according to TDD UL/DL configuration or a sensing operation, and each S-UE may transmit information related to the time offset to a T-UE. Here, for example, the range of the variable time offset may have a processing time of the S-UE as a lower limit value and a specific value as an upper limit value. For example, the range of the time offset may be configured or pre-configured for a UE. For example, the range of the time offset may be defined for a UE. For example, the range of the time offset may be configured to a UE through RRC signaling or the like.

As another embodiment, when an SL slot used by an S-UE to transmit information related to a time offset is limited to a specific resource pool (e.g., resource pool for positioning), the time offset may be determined by the number of logical slots related to the resource pool, not the number of physical slots. In this case, the S-UE may transmit PRS reception timing information to the T-UE using a pre-configured/defined time offset. Alternatively, when it is necessary to vary the time offset by the sensing operation of an S-UE, etc., the S-UE may transmit a variable time offset as the number of physical slots or the number of logical slots instead of PRS reception timing information.

On the other hand, when a UE performs SL communication based on an SL dedicated carrier (e.g., an Intelligent Transport System (ITS) carrier), the UE may use the entire slot as an SL slot without limitation by the TDD UL/DL configuration. Accordingly, an S-UE may transmit PRS reception timing information of the S-UE to a T-UE, using an absolute time offset configured/defined as a physical slot or a logical slot (in this case, a logical slot has the same meaning as a physical slot). Alternatively, when the time offset needs to be varied due to a sensing operation of an S-UE, the S-UE may transmit the variable time offset as the number of physical slots or the number of logical slots instead of the PRS reception timing information.

According to various embodiments of the present disclosure, a method by which a T-UE can estimate its absolute position, if the T-UE cannot see the three positioning reference (e.g., a base station) that can accurately know the absolute position, or cannot see a base station because the T-UE is out of the coverage of the base station, when the T-UE can see one RSU installed on the road or one UE that knows the absolute position, has been proposed. In addition, even when the time synchronization between an RSU and a UE does not match, a method in which a T-UE can estimate its location without a positioning estimation error has been proposed.

Figure 18:
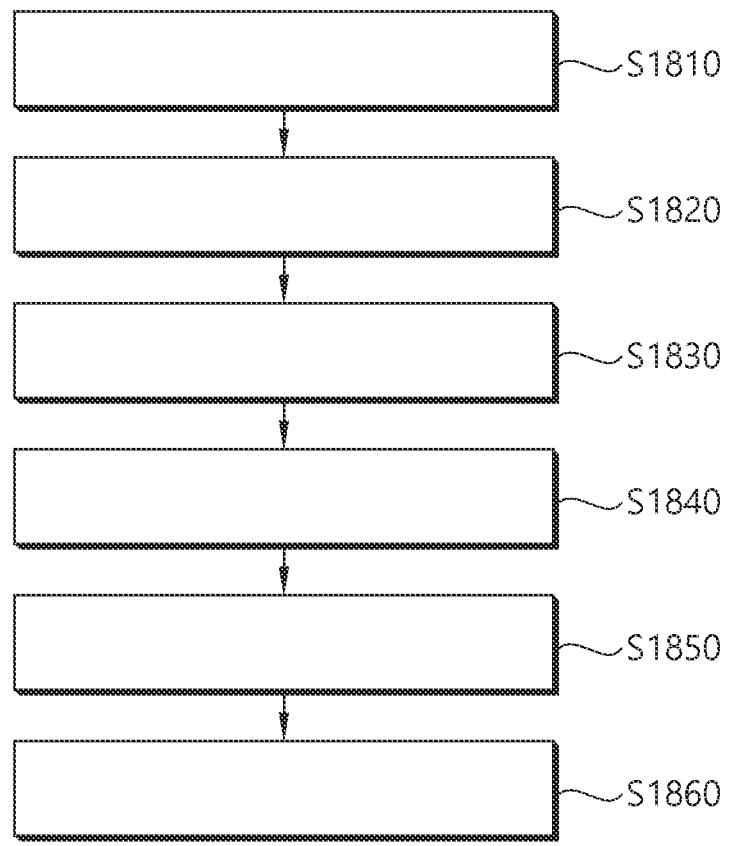
FIG. 18 shows a method for a first apparatus to perform wireless communication, according to an embodiment of the present disclosure.

FIG. 18 shows a method for a first apparatus to perform wireless communication, according to an embodiment of the present disclosure. The embodiment of FIG. 18 may be combined with various embodiments of the present disclosure.

Referring to FIG. 18, in step S1810, a first apparatus may receive information related to an absolute position of a positioning reference, from the positioning reference. In step S1820, a first apparatus may obtain a first positioning reference signal (PRS) reception timing, based on a PRS received from the positioning reference. In step S1830, a first apparatus may obtain a second PRS reception timing at which a second apparatus receives the PRS from the positioning reference, based on a phase difference value between first RSs received on first subcarriers from the second apparatus. In step S1840, a first apparatus may obtain a third PRS reception timing at which a third apparatus receives the PRS from the positioning reference, based on a phase difference value between second RSs received on second subcarriers from the third apparatus. In step S1850, a first apparatus may estimate a relative position of the positioning reference, based on the first PRS reception timing, the second PRS reception timing, and the third PRS reception timing. In step S1860, a first apparatus may obtain position information of the first apparatus, based on the absolute position and the relative position.

For example, mapping information between a phase difference value and a PRS reception timing may be configured for the first apparatus. For example, the second PRS reception timing may be obtained by the first apparatus based on the phase difference value between the first RSs and the mapping information, and the third PRS reception timing may be obtained by the first apparatus based on the phase difference value between the second RSs and the mapping information.

For example, a number of subcarriers to which the first RSs or the second RSs can be mapped or an indexes of the subcarriers configured for the first apparatus. For example, the first subcarriers and the second subcarriers may be included in the subcarriers.

For example, the phase difference value between the first RSs may be obtained based on at least one phase difference value for a pair of the first RSs, and the phase difference value between the second RSs may be obtained based on at least one phase difference value for a pair of the second RSs.

For example, the positioning reference may be an apparatus with positional accuracy greater than or equal to a threshold.

For example, obtaining the position information of the first apparatus may include: (i) estimating a position of the first apparatus based on positioning and (ii) obtaining the position information of the first apparatus by correcting the estimated position of the first apparatus by a difference between the absolute position and the relative position.

For example, the second PRS reception timing may be, a value obtained by subtracting (i) a transmission required time related to the first RSs, obtained based on distance between the first apparatus and the second apparatus and (ii) a time offset, from a timing at which the first apparatus receives the first RSs, and the third PRS reception timing may be, a value obtained by subtracting (i) a transmission required time related to the second RSs, obtained based on distance between the first apparatus and the third apparatus and (ii) a time offset, from a timing at which the first apparatus receives the second RSs.

For example, the first RSs may be transmitted by the second apparatus, after a time offset from a time point when the second apparatus receives the PRS from the positioning reference, and the second RSs may be transmitted by the third apparatus, after a time offset from a time point when the third apparatus receives the PRS from the positioning reference. For example, the time offset may be configured to a same value for the first apparatus, the second apparatus, and the third apparatus. For example, the time offset may be configured for the first apparatus, the second apparatus, and the third apparatus, respectively, and the time offset may be exchanged between the first apparatus, the second apparatus, and the third apparatus.

For example, the second PRS reception timing may be received from the second apparatus through a physical sidelink control channel (PSCCH), and the third PRS reception timing may be received from the third apparatus through a PSCCH.

The proposed method may be applied to an apparatus according to various embodiments of the present disclosure. First, a processor 102 of a first apparatus 100 may control a transceiver 106 to receive information related to an absolute position of a positioning reference, from the positioning reference. And, a processor 102 of a first apparatus 100 may obtain a first positioning reference signal (PRS) reception timing, based on a PRS received from the positioning reference. And, a processor 102 of a first apparatus 100 may obtain a second PRS reception timing at which a second apparatus receives the PRS from the positioning reference, based on a phase difference value between first RSs received on first subcarriers from the second apparatus. And, a processor 102 of a first apparatus 100 may obtain a third PRS reception timing at which a third apparatus receives the PRS from the positioning reference, based on a phase difference value between second RSs received on second subcarriers from the third apparatus. And, a processor 102 of a first apparatus 100 may estimate a relative position of the positioning reference, based on the first PRS reception timing, the second PRS reception timing, and the third PRS reception timing. And, a processor 102 of a first apparatus 100 may obtain position information of the first apparatus, based on the absolute position and the relative position.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: receive information related to an absolute position of a positioning reference, from the positioning reference; obtain a first positioning reference signal (PRS) reception timing, based on a PRS received from the positioning reference; obtain a second PRS reception timing at which a second apparatus receives the PRS from the positioning reference, based on a phase difference value between first RSs received on first subcarriers from the second apparatus; obtain a third PRS reception timing at which a third apparatus receives the PRS from the positioning reference, based on a phase difference value between second RSs received on second subcarriers from the third apparatus; estimate a relative position of the positioning reference, based on the first PRS reception timing, the second PRS reception timing, and the third PRS reception timing; and obtain position information of the first apparatus, based on the absolute position and the relative position.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive information related to an absolute position of a positioning reference, from the positioning reference; obtain a first positioning reference signal (PRS) reception timing, based on a PRS received from the positioning reference; obtain a second PRS reception timing at which a second UE receives the PRS from the positioning reference, based on a phase difference value between first RSs received on first subcarriers from the second UE; obtain a third PRS reception timing at which a third UE receives the PRS from the positioning reference, based on a phase difference value between second RSs received on second subcarriers from the third UE; estimate a relative position of the positioning reference, based on the first PRS reception timing, the second PRS reception timing, and the third PRS reception timing; and obtain position information of the first UE, based on the absolute position and the relative position.

According to an embodiment of the present disclosure, a non-transitory computer-readable storage medium storing instructions may be proposed. For example, the instructions, when executed, may cause a first apparatus to: receive information related to an absolute position of a positioning reference, from the positioning reference; obtain a first positioning reference signal (PRS) reception timing, based on a PRS received from the positioning reference; obtain a second PRS reception timing at which a second apparatus receives the PRS from the positioning reference, based on a phase difference value between first RSs received on first subcarriers from the second apparatus; obtain a third PRS reception timing at which a third apparatus receives the PRS from the positioning reference, based on a phase difference value between second RSs received on second subcarriers from the third apparatus; estimate a relative position of the positioning reference, based on the first PRS reception timing, the second PRS reception timing, and the third PRS reception timing; and obtain position information of the first apparatus, based on the absolute position and the relative position.

Various embodiments of the present disclosure may be combined with each other.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
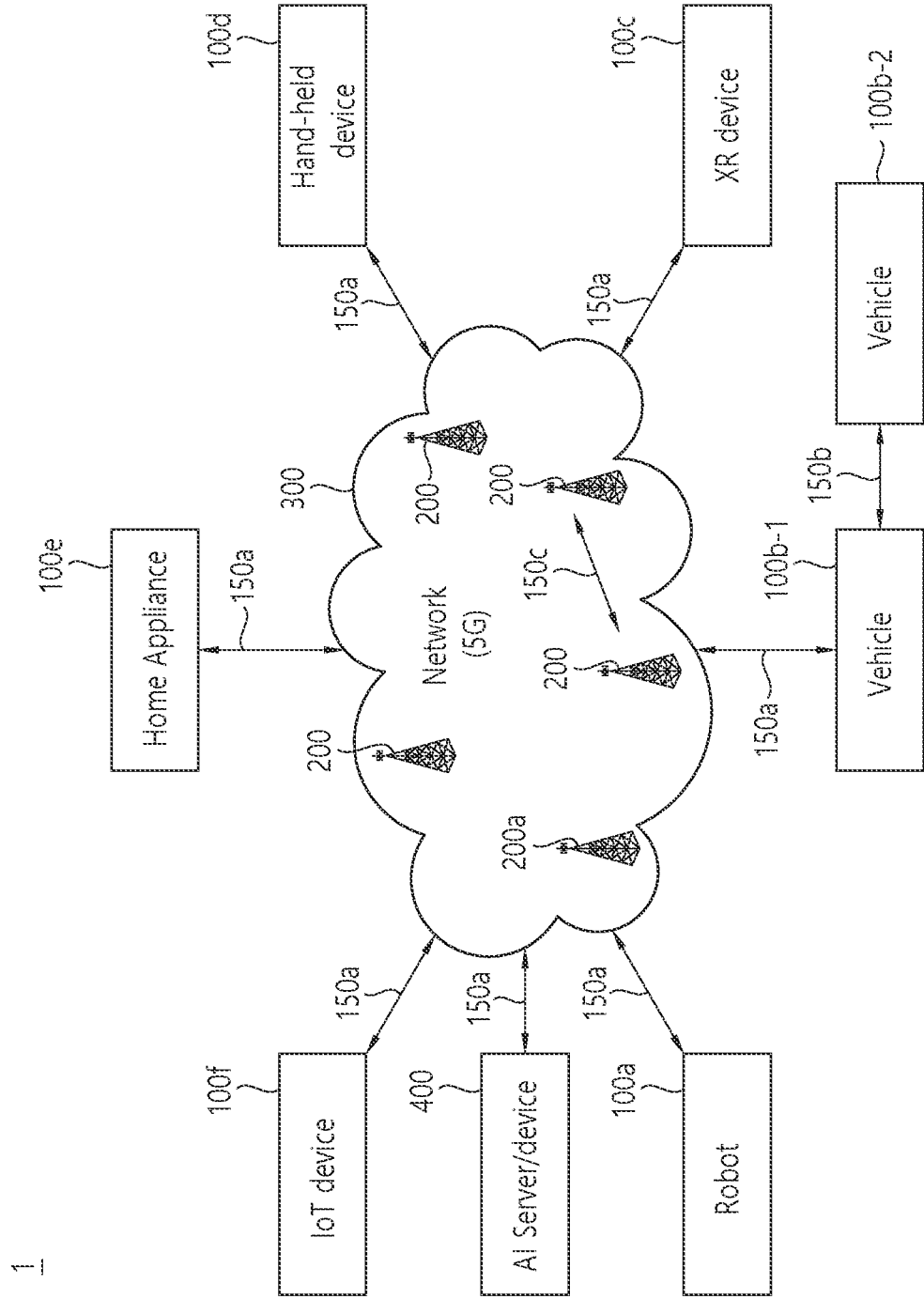
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
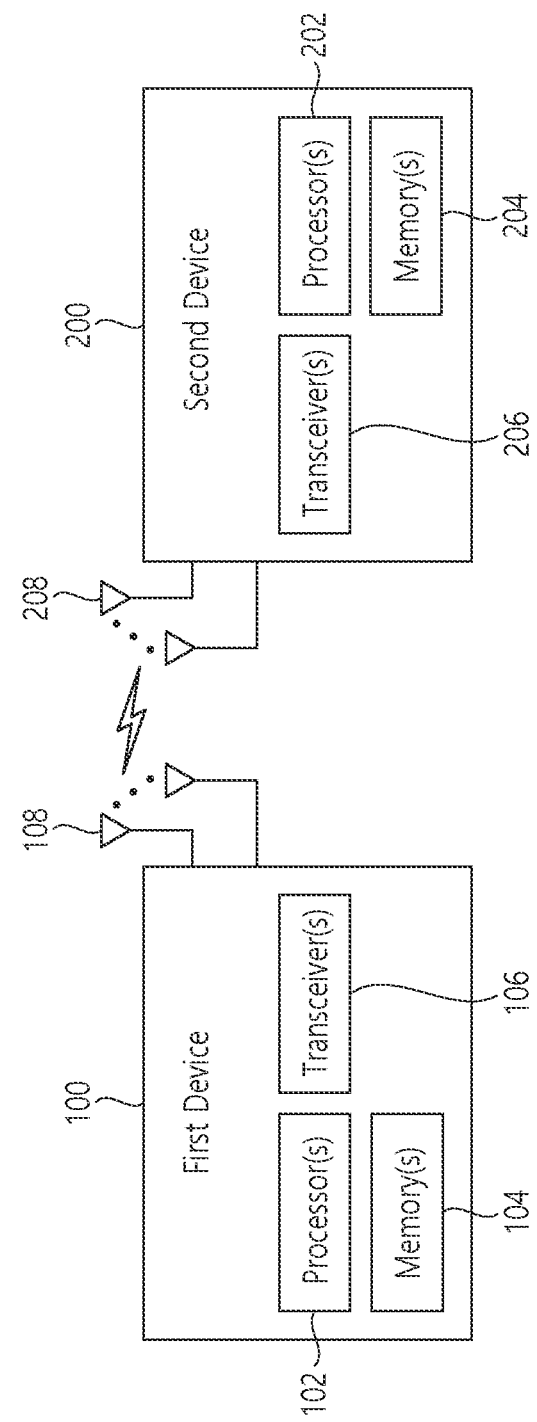
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
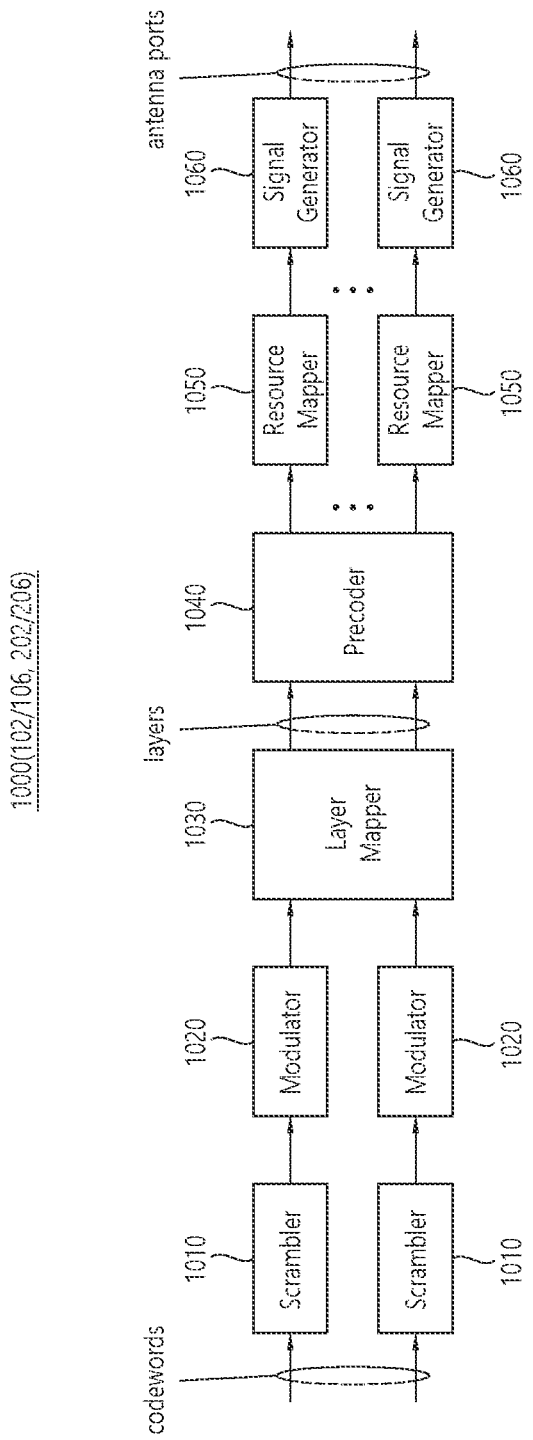
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
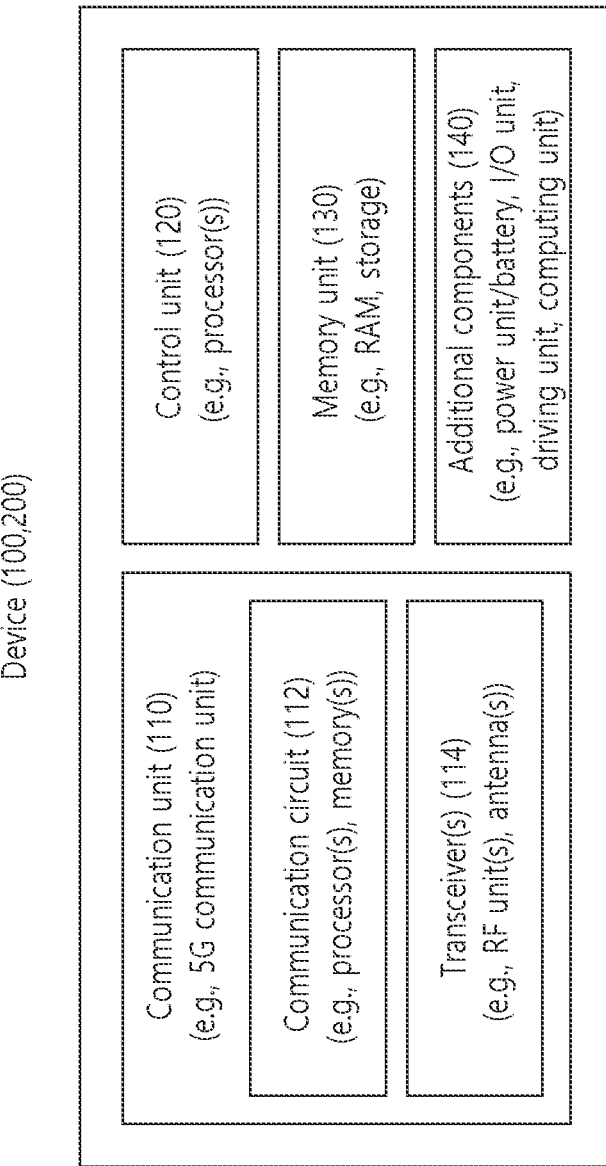
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
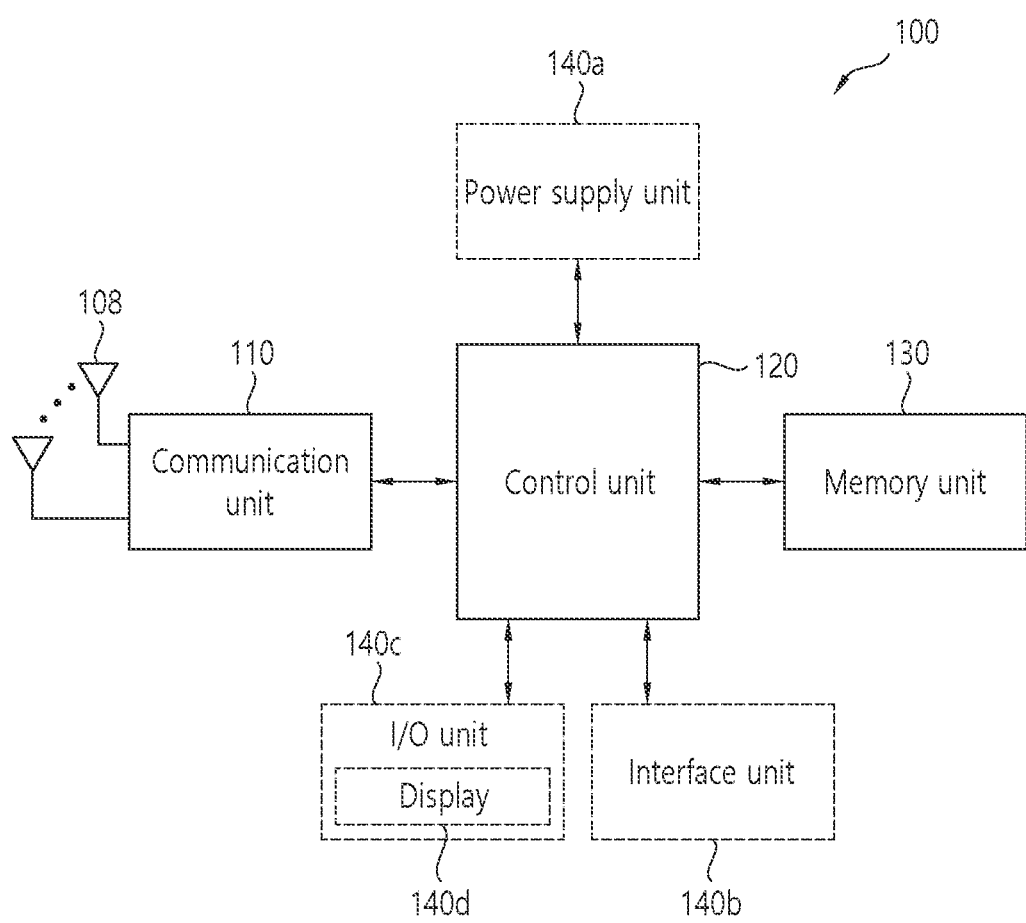
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
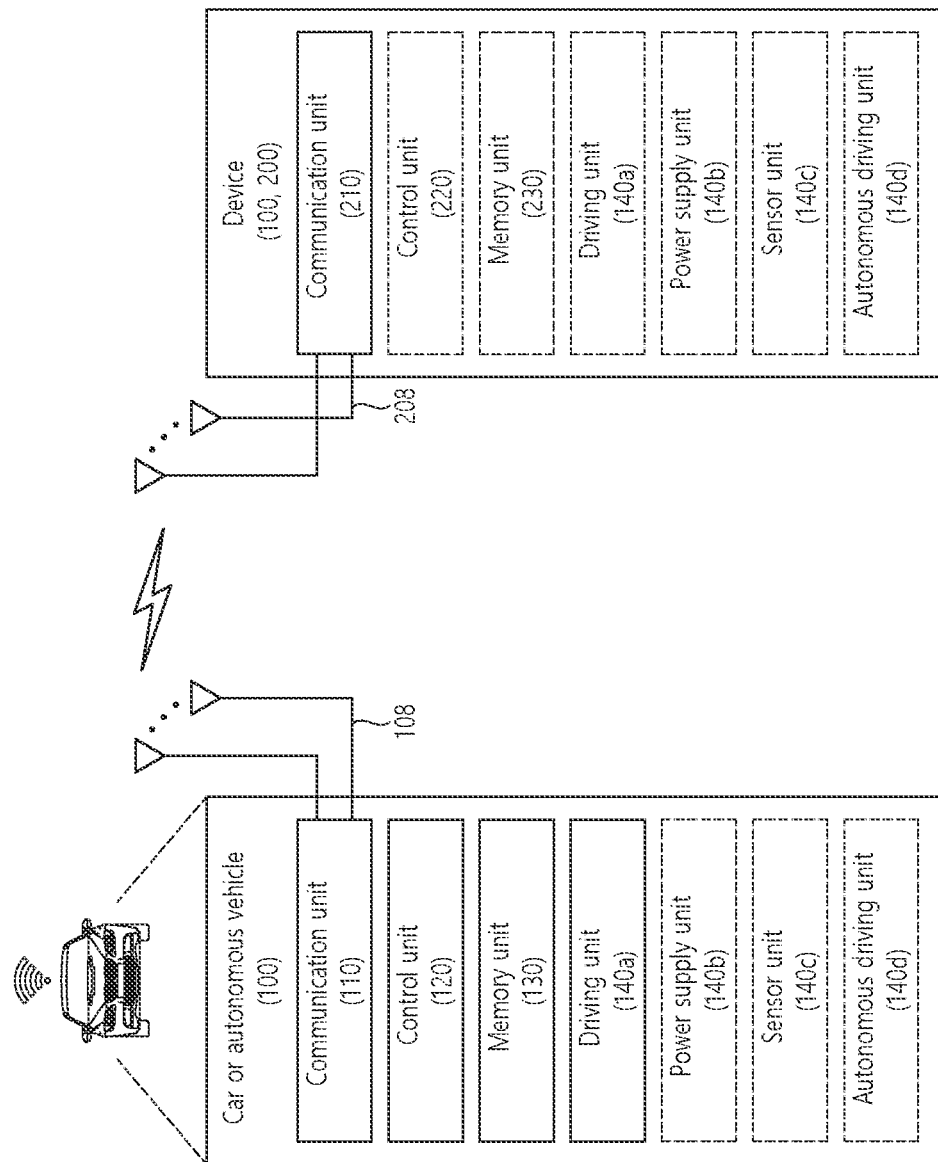
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
receiving, by a first apparatus, information related to an absolute position of a positioning reference, from the positioning reference;
obtaining, by the first apparatus, a first positioning reference signal (PRS) reception timing, based on a PRS received from the positioning reference;
obtaining, by the first apparatus, a second PRS reception timing at which a second apparatus receives the PRS from the positioning reference, based on a phase difference value between first RSs received on first subcarriers from the second apparatus;
obtaining, by the first apparatus, a third PRS reception timing at which a third apparatus receives the PRS from the positioning reference, based on a phase difference value between second RSs received on second subcarriers from the third apparatus;
estimating, by the first apparatus, a relative position of the positioning reference, based on the first PRS reception timing, the second PRS reception timing, and the third PRS reception timing; and
obtaining, by the first apparatus, position information of the first apparatus, based on the absolute position and the relative position,
wherein the positioning reference is an apparatus with positional accuracy greater than or equal to a threshold.

2. The method of claim 1, wherein mapping information is configured for the first apparatus, and
wherein the mapping information comprises at least one of:
a mapping of the phase difference value between the first RSs to the second PRS reception timing; or
a mapping of the phase difference value between the second RSs to the third PRS reception timing.

3. The method of claim 2, wherein the second PRS reception timing is obtained by the first apparatus based on the phase difference value between the first RSs and the mapping information; and wherein the third PRS reception timing is obtained by the first apparatus based on the phase difference value between the second RSs and the mapping information.

4. The method of claim 1, wherein a number of subcarriers to which the first RSs or the second RSs can be mapped or an indexes of the subcarriers configured for the first apparatus.

5. The method of claim 4, wherein the first subcarriers and the second subcarriers are included in the subcarriers.

6. The method of claim 1, wherein the phase difference value between the first RSs is obtained based on at least one phase difference value for a pair of the first RSs, and
wherein the phase difference value between the second RSs is obtained based on at least one phase difference value for a pair of the second RSs.

7. The method of claim 1, wherein obtaining the position information of the first apparatus includes: (i) estimating a position of the first apparatus based on positioning and (ii) obtaining the position information of the first apparatus by correcting the estimated position of the first apparatus by a difference between the absolute position and the relative position.

8. The method of claim 1, wherein the second PRS reception timing is, a value obtained by subtracting (i) a transmission required time related to the first RSs, obtained based on distance between the first apparatus and the second apparatus and (ii) a time offset, from a timing at which the first apparatus receives the first RSs, and
wherein the third PRS reception timing is, a value obtained by subtracting (i) a transmission required time related to the second RSs, obtained based on distance between the first apparatus and the third apparatus and (ii) a time offset, from a timing at which the first apparatus receives the second RSs.

9. The method of claim 1, wherein the first RSs are transmitted by the second apparatus, after a time offset from a time point when the second apparatus receives the PRS from the positioning reference, and
wherein the second RSs are transmitted by the third apparatus, after a time offset from a time point when the third apparatus receives the PRS from the positioning reference.

10. The method of claim 9, wherein the time offset is configured to a same value for the first apparatus, the second apparatus, and the third apparatus.

11. The method of claim 9, wherein the time offset is configured for the first apparatus, the second apparatus, and the third apparatus, respectively, and
wherein the time offset is exchanged between the first apparatus, the second apparatus, and the third apparatus.

12. The method of claim 1, wherein the second PRS reception timing is received from the second apparatus through a physical sidelink control channel (PSCCH), and
wherein the third PRS reception timing is received from the third apparatus through a PSCCH.

13. A first apparatus comprising:
one or more memories storing instructions;
one or more transceivers; and
one or more processors connected to the one or more memories and the one or more transceivers, wherein the one or more processors execute the instructions to:
receive information related to an absolute position of a positioning reference, from the positioning reference;
obtain a first positioning reference signal (PRS) reception timing, based on a PRS received from the positioning reference;

obtain a second PRS reception timing at which a second apparatus receives the PRS from the positioning reference, based on a phase difference value between first RSs received on first subcarriers from the second apparatus;

obtain a third PRS reception timing at which a third apparatus receives the PRS from the positioning reference, based on a phase difference value between second RSs received on second subcarriers from the third apparatus;

estimate a relative position of the positioning reference, based on the first PRS reception timing, the second PRS reception timing, and the third PRS reception timing; and obtain position information of the first apparatus, based on the absolute position and the relative position, wherein the positioning reference is an apparatus with positional accuracy greater than or equal to a threshold.

14. An apparatus configured to control a first user equipment (UE), the apparatus comprising:

one or more processors; and one or more memories operably connectable to the one or more processors and storing instructions, wherein the one or more processors execute the instructions to:

receive information related to an absolute position of a positioning reference, from the positioning reference;

obtain a first positioning reference signal (PRS) reception timing, based on a PRS received from the positioning reference;

obtain a second PRS reception timing at which a second UE receives the PRS from the positioning reference, based on a phase difference value between first RSs received on first subcarriers from the second UE;

obtain a third PRS reception timing at which a third UE receives the PRS from the positioning reference, based on a phase difference value between second RSs received on second subcarriers from the third UE;

estimate a relative position of the positioning reference, based on the first PRS reception timing, the second PRS reception timing, and the third PRS reception timing; and obtain position information of the first UE, based on the absolute position and the relative position, wherein the positioning reference is an apparatus with positional accuracy greater than or equal to a threshold.

* * * * *